United States Patent [19]

Kukesh et al.

[11] Patent Number: 5,178,326
[45] Date of Patent: * Jan. 12, 1993

[54] INDUSTRIAL SPRAYING SYSTEM

[75] Inventors: Timothy S. Kukesh, Indianapolis; Gregory Mansfield, Zionsville, both of Ind.

[73] Assignee: Glas-Craft, Inc., Indianapolis, Ind.

[ * ] Notice: The portion of the term of this patent subsequent to Nov. 6, 2007 has been disclaimed.

[21] Appl. No.: 601,828
[22] PCT Filed: Mar. 30, 1990
[86] PCT No.: PCT/US90/01691
§ 371 Date: Nov. 7, 1990
§ 102(e) Date: Nov. 7, 1990
[87] PCT Pub. No.: WO90/12650
PCT Pub. Date: Nov. 1, 1990

Related U.S. Application Data

[63] Continuation-in-part of Ser. No. 342,185, Apr. 24, 1989, Pat. No. 4,967,956, which is a continuation-in-part of Ser. No. 80,475, Jul. 31, 1987, Pat. No. 4,824,017, which is a continuation-in-part of Ser. No. 885,006, Jul. 14, 1986, abandoned.

[51] Int. Cl.$^5$ .................. B05B 7/08; B05B 1/28; B05B 9/08
[52] U.S. Cl. .................. 239/8; 239/11; 239/296; 239/299; 239/422
[58] Field of Search .................. 239/8, 11, 290, 296, 239/299, 418, 422, 154

[56] References Cited

U.S. PATENT DOCUMENTS

| D. 252,097 | 6/1979 | Probst et al. ................ D23/17 |
| 2,004,033 | 6/1935 | Buzzard et al. ............... 239/296 |
| 2,049,700 | 8/1936 | Gustafsson .................. 239/296 X |
| 2,780,496 | 2/1957 | Asbeck et al. ............... 299/140.1 |
| 2,864,653 | 12/1958 | Liedberg et al. ............. 299/140 |
| 3,202,363 | 8/1965 | Kautz et al. ................ 239/413 |
| 3,521,824 | 7/1970 | Wilcox ...................... 239/424.5 |
| 3,635,400 | 1/1972 | Nord et al. ................. 239/15 |
| 3,675,895 | 7/1972 | Matousek ................... 251/315 |
| 3,735,956 | 5/1973 | Matousek ................... 251/315 |
| 3,799,403 | 3/1974 | Probst et al. ............... 222/135 |
| 3,843,052 | 10/1974 | Cowan ...................... 239/3 |

(List continued on next page.)

FOREIGN PATENT DOCUMENTS 57-90762 6/1982 Japan .
735983 8/1955 United Kingdom ............ 69/3

Primary Examiner—Andres Kashnikow
Assistant Examiner—William Grant
Attorney, Agent, or Firm—Willian Brinks Olds Hofer Gilson & Lione

[57] ABSTRACT

A compact, well defined and easily used spray pattern is formed with substantial containment of the plural component materials and reduced contamination of the work environment. Connections for the plural component materials are supported and carried on a workman's body, and the plurality of components of the plural component material flow to, and are combined at the connections and are carried through a single flexible conduit to a lightweight spray gun easily manipulated. In addition, a valve can be provided in the system and operated to place it in a first position in which the flow of solvent is blocked and the flows of the first and second components of the plural component material are permitted to flow through the connections and check valves to be combined in the valve and directed in a combined flow from the valve output connection, and in a second position in which the flows of the plural components are blocked and a flow of solvent is permitted through the connections and check valves and the valve and is directed by the valve through the valve output connection, the single flexible conduit and the spray gun. In an air-assisted airless atomization internal mix system, compressed air is directed to impinge upon the expanding edges of a fan-like stream of mixed resin and catalyst downstream of the impingement of a flow of compressed air on the fan-like stream to capture particles in small, uniform spray pattern.

14 Claims, 10 Drawing Sheets

U.S. PATENT DOCUMENTS

| | | | |
|---|---|---|---|
| 3,893,621 | 7/1975 | Johnson | 239/9 |
| 4,026,516 | 5/1977 | Matousek | 251/214 |
| 4,083,493 | 4/1978 | Wiggins | 239/112 |
| 4,123,007 | 10/1978 | Gardner | 239/414 |
| 4,219,157 | 8/1980 | Binoche | 239/299 X |
| 4,281,683 | 8/1981 | Hetherington et al. | 137/606 |
| 4,325,513 | 4/1982 | Smith et al. | 239/112 |
| 4,386,739 | 6/1983 | Kwok | 239/296 |
| 4,407,454 | 10/1983 | Massey | 239/154 |
| 4,549,676 | 10/1985 | Gerich | 222/145 |
| 4,618,098 | 10/1986 | Hedger, Jr. et al. | 239/290 |
| 4,645,127 | 2/1987 | Emory et al. | 239/299 |
| 4,685,488 | 8/1987 | Corbin et al. | 137/328 |
| 4,713,257 | 12/1987 | Luttermoller | 427/27 |
| 4,745,011 | 5/1988 | Fukuta et al. | 427/426 |
| 4,760,956 | 8/1988 | Mansfield | 239/8 |
| 4,767,057 | 8/1988 | Degli et al. | 239/296 |
| 4,824,017 | 4/1989 | Mansfield | 239/9 |
| 4,854,504 | 8/1989 | Hedger, Jr. et al. | 239/296 X |
| 4,967,956 | 11/1990 | Mansfield . | |

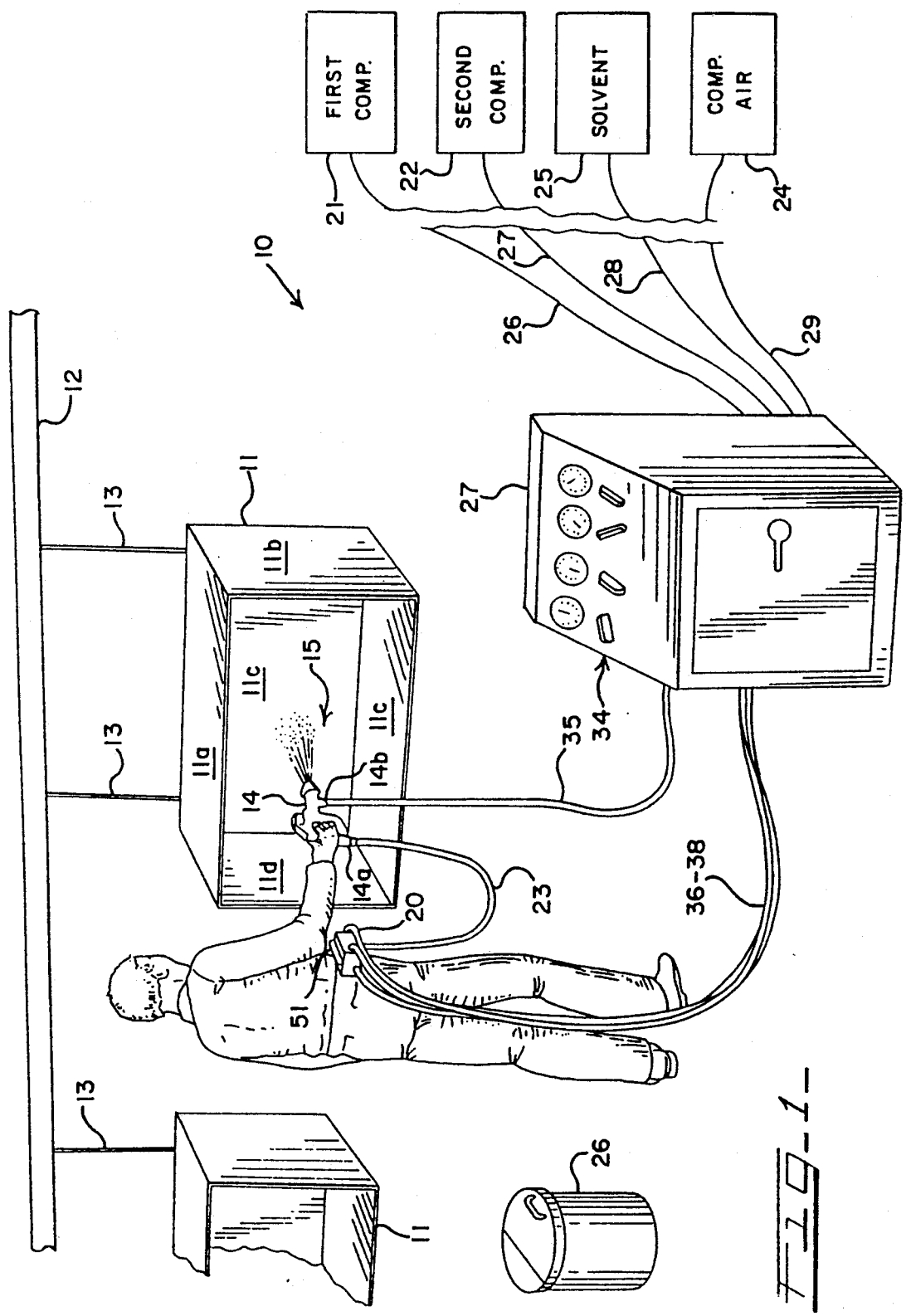

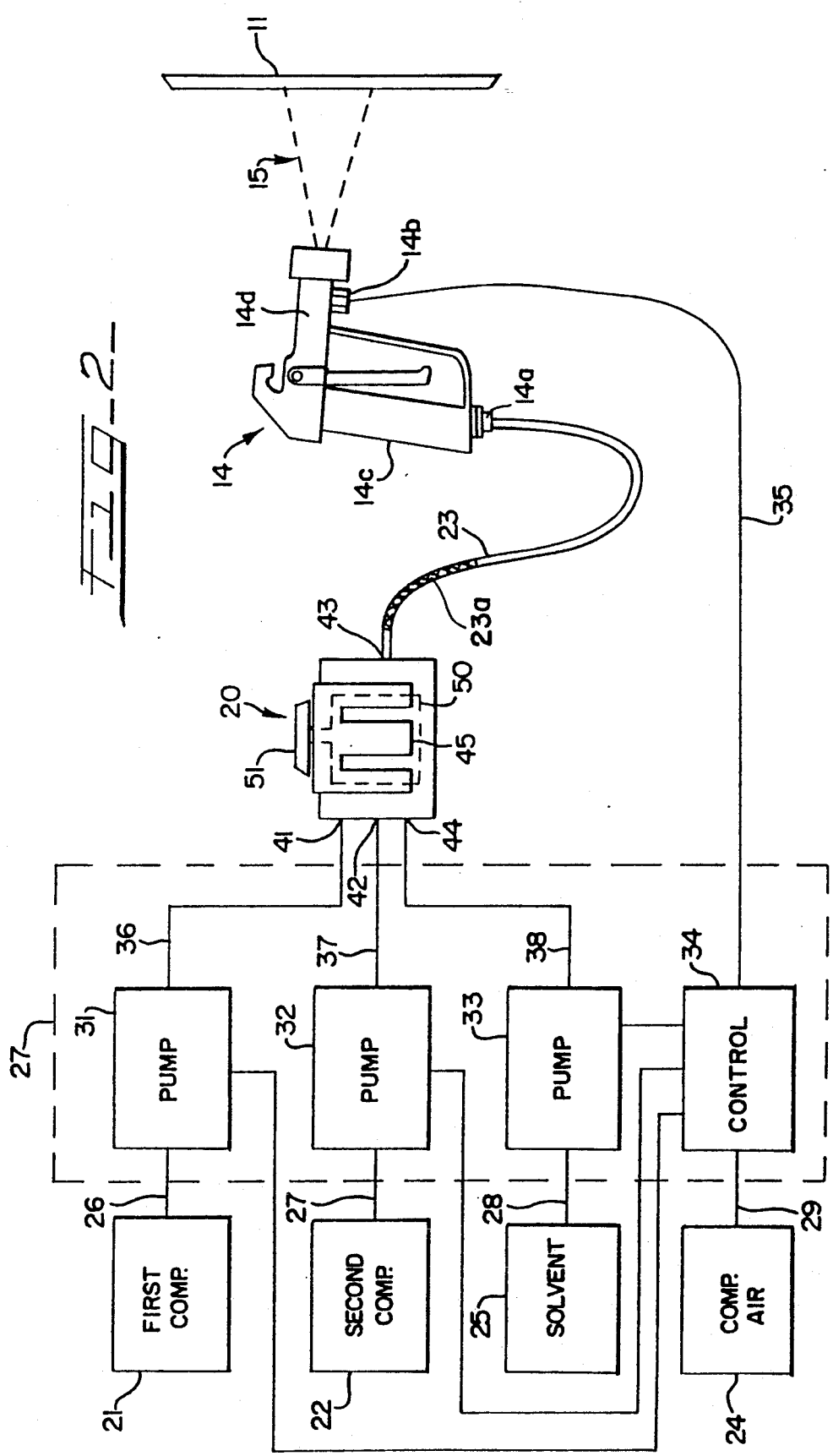

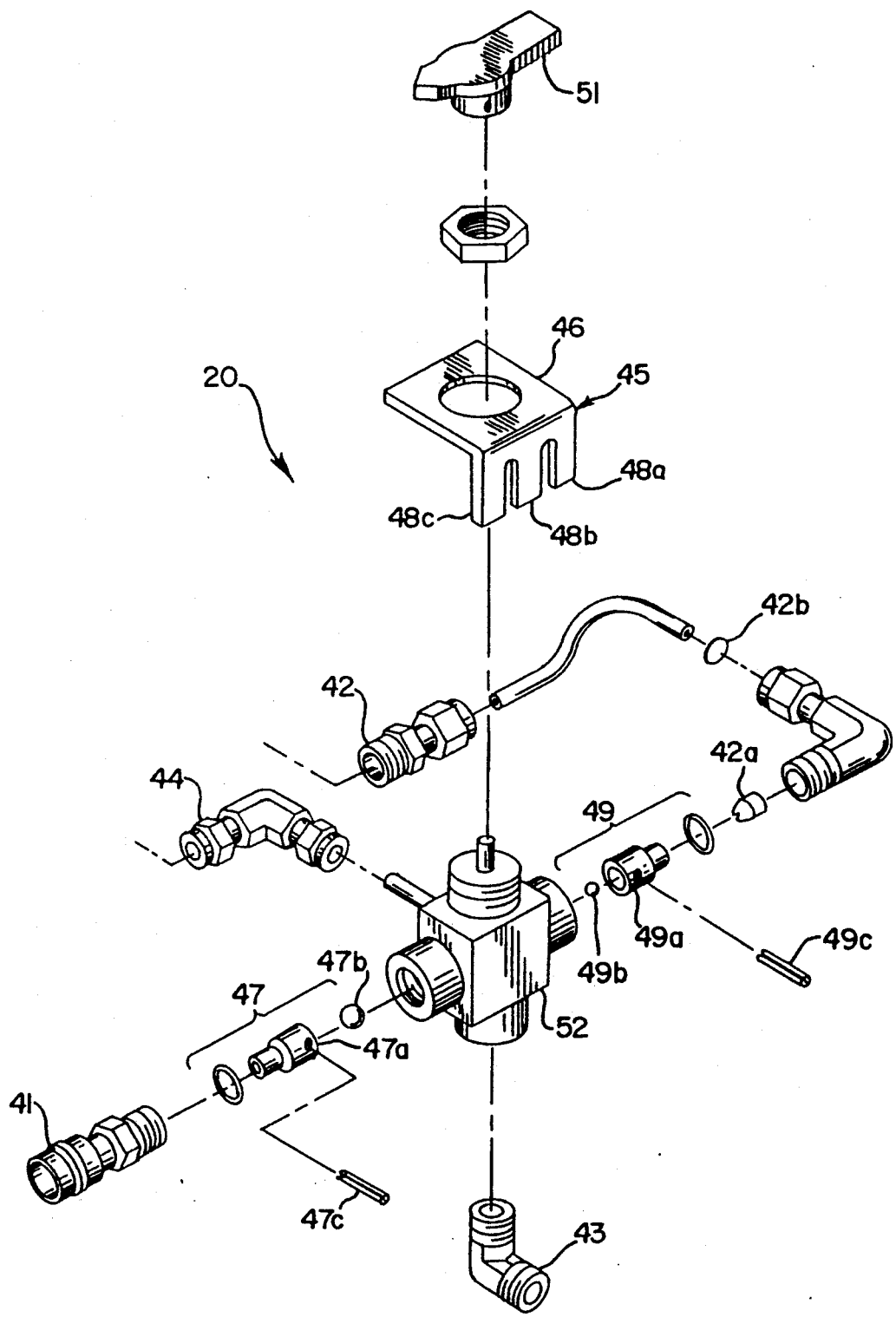

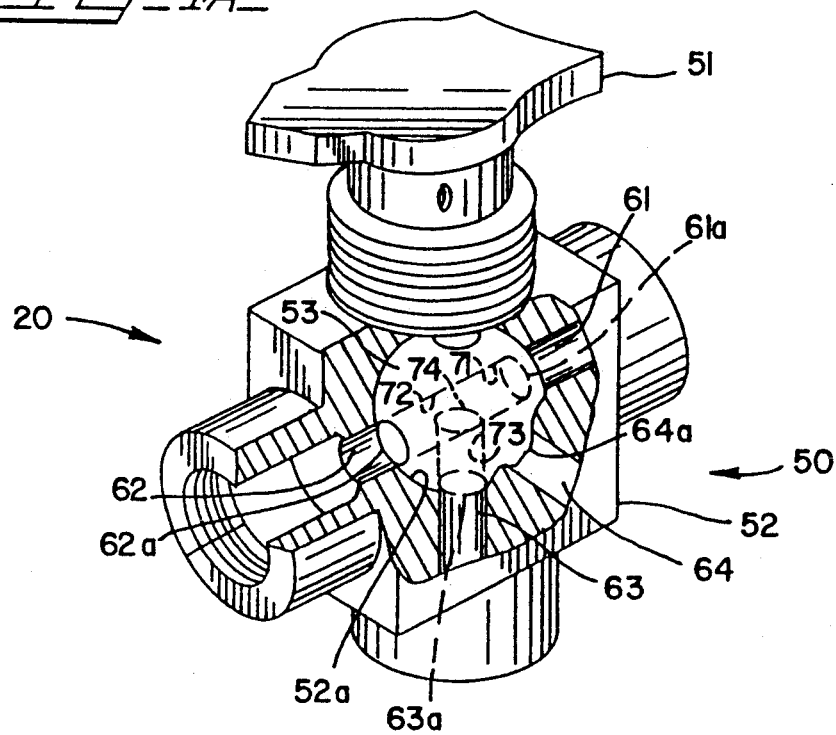
FIG.-4A-
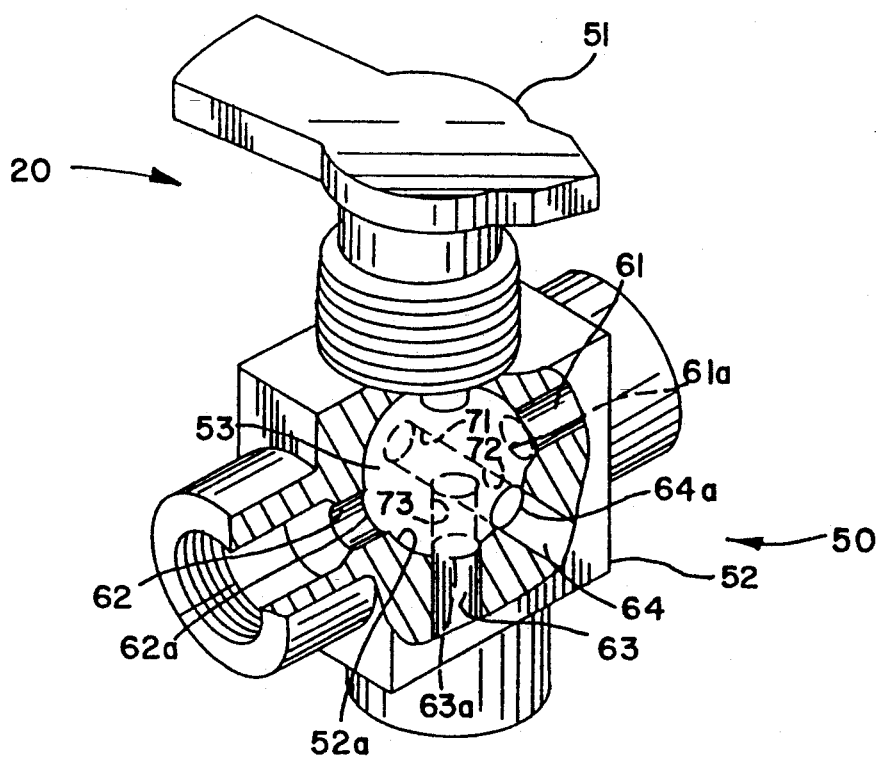
FIG.-4B-

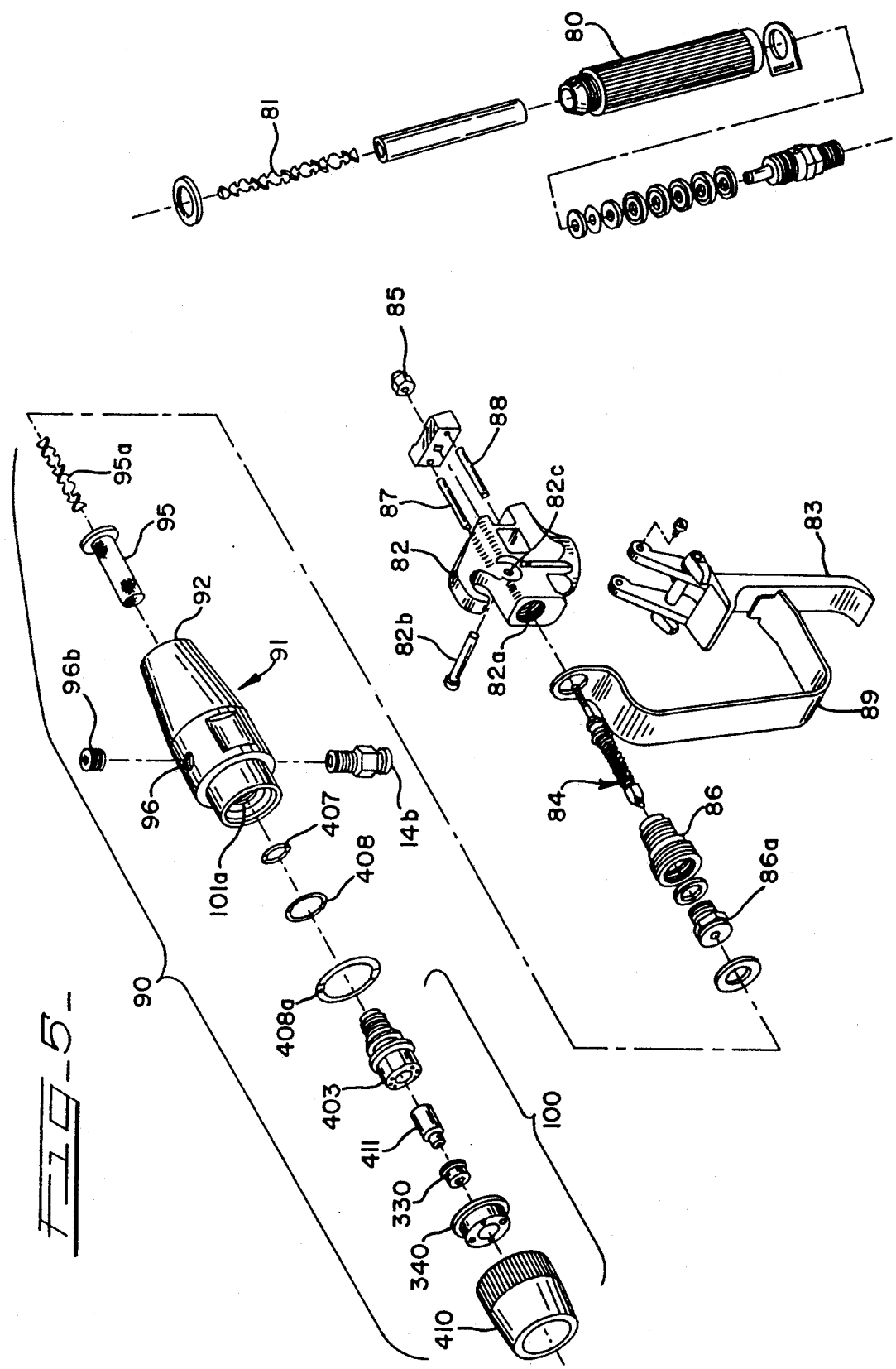

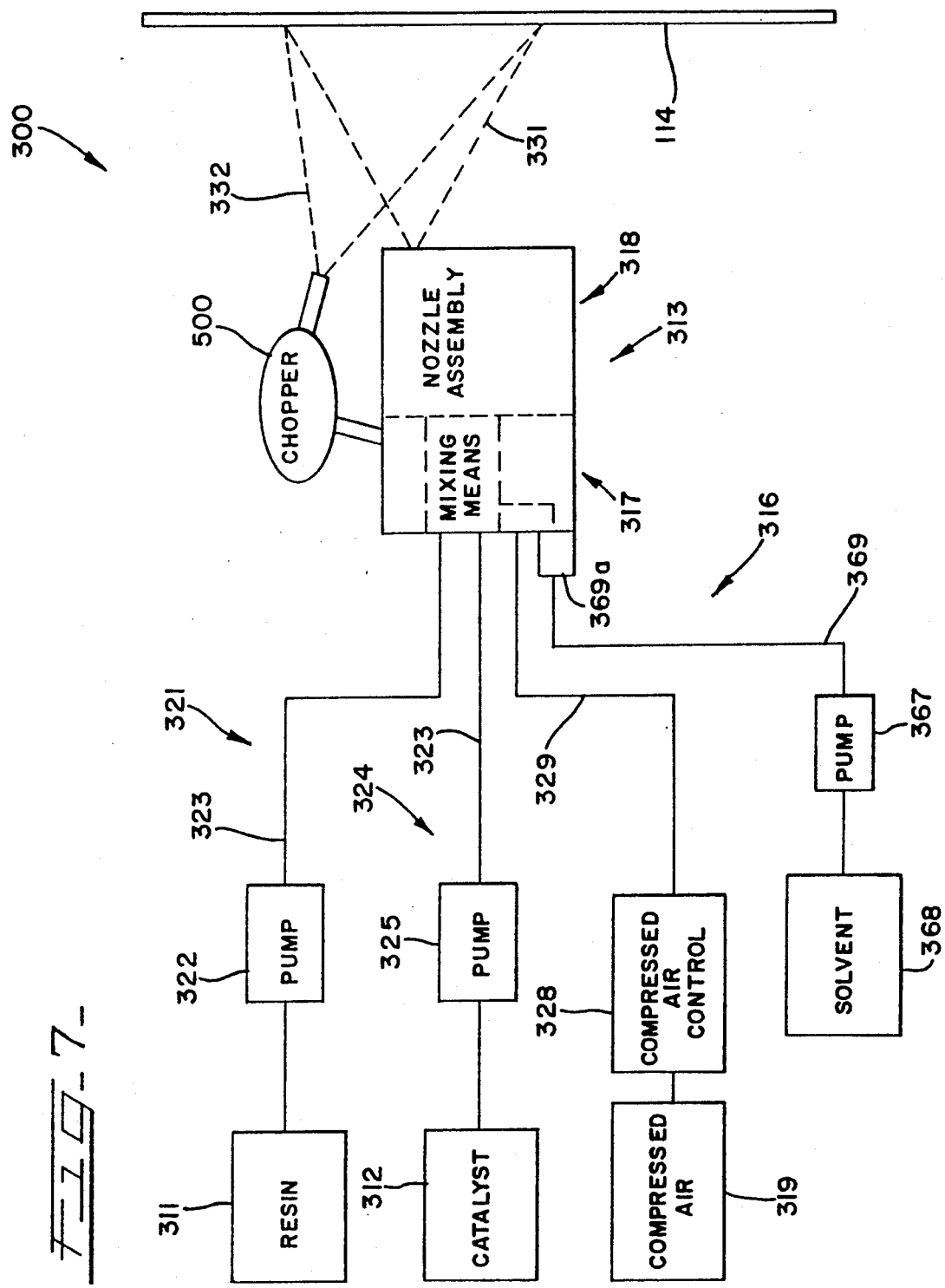

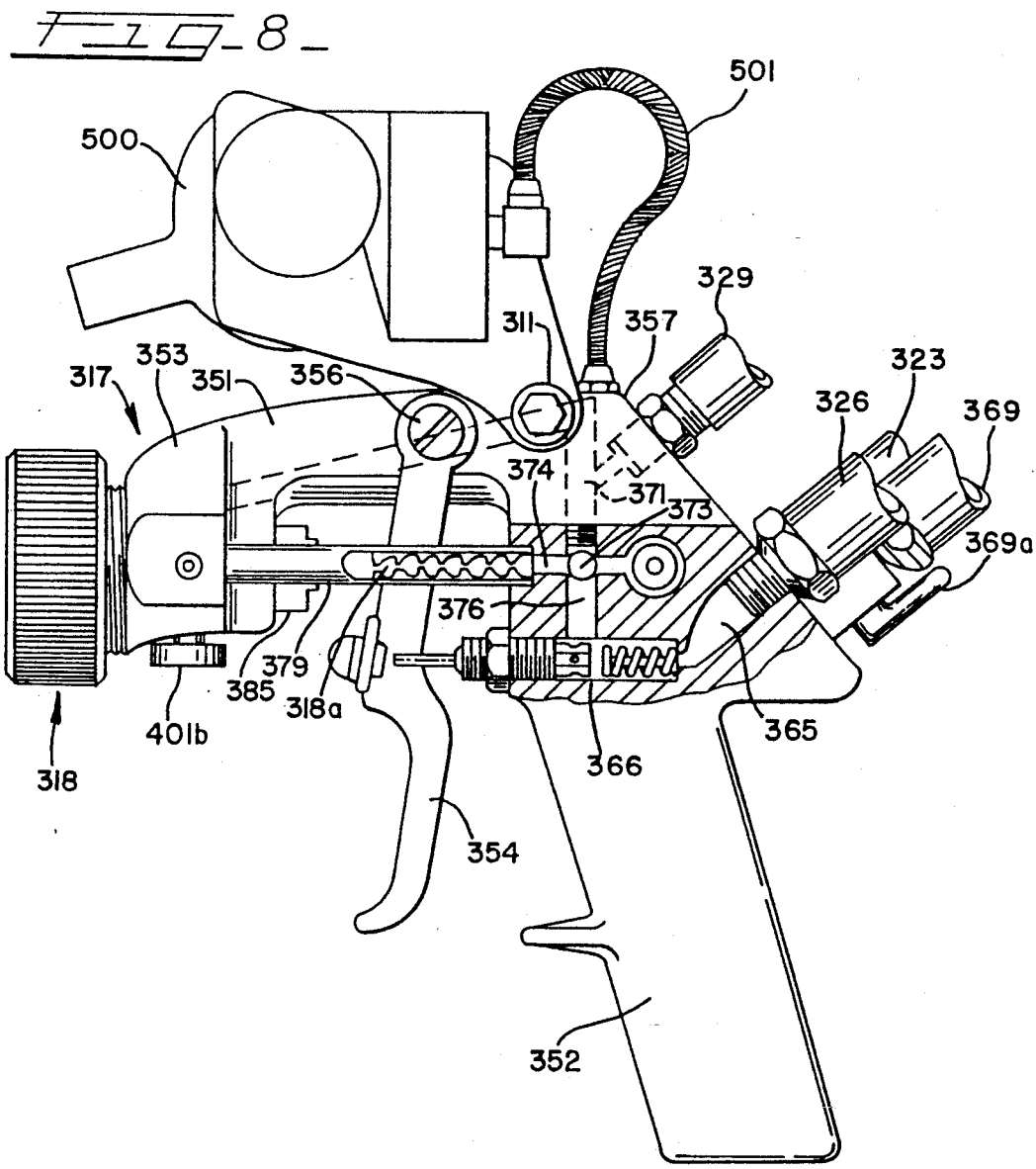

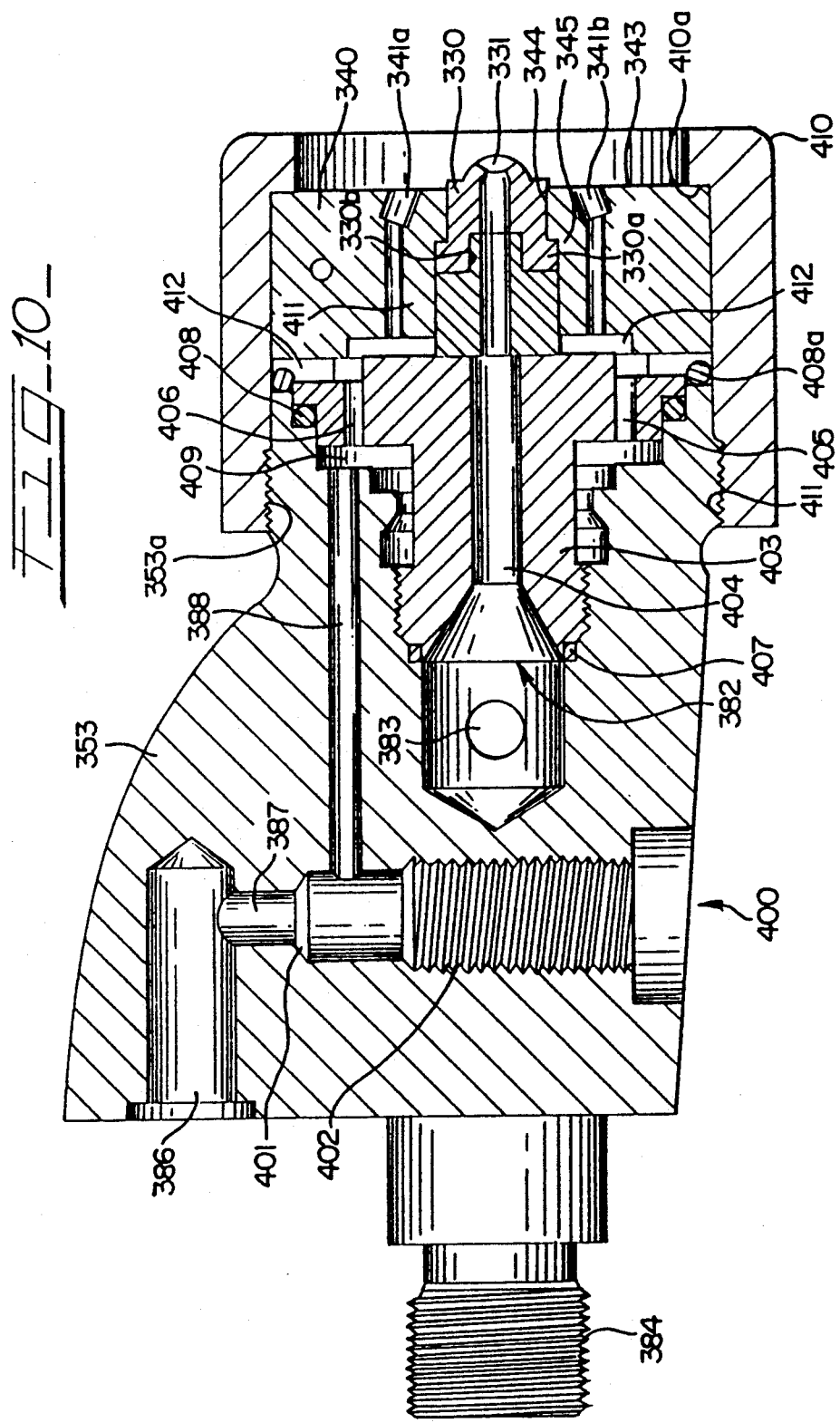

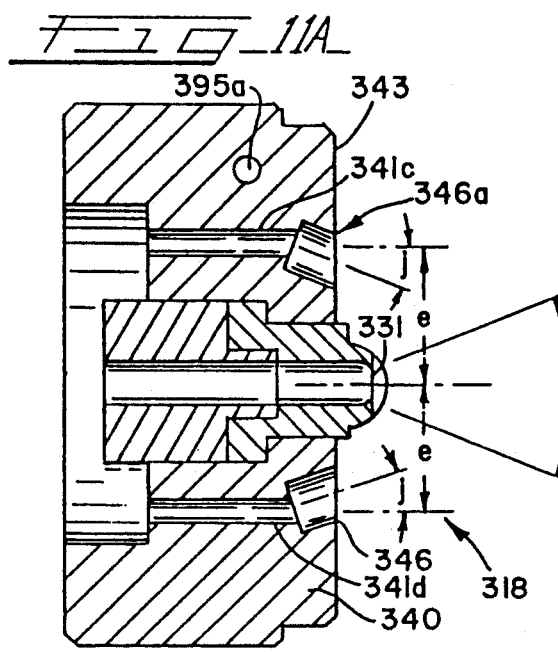
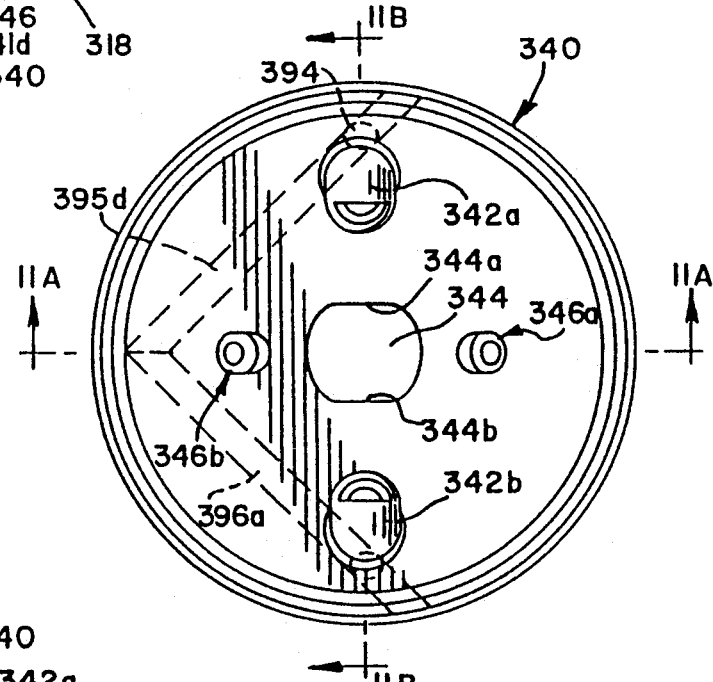
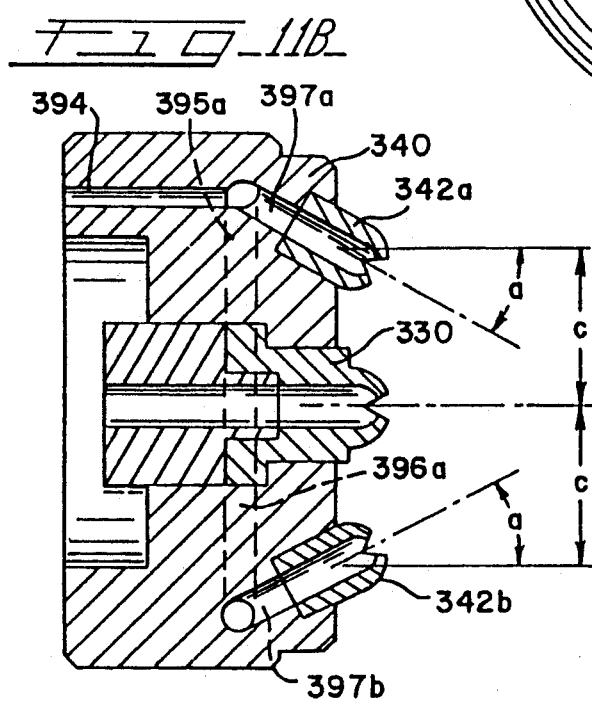

INDUSTRIAL SPRAYING SYSTEM

This is a continuation of International Patent Application PCT/US90/01691 filed Mar. 30, 1990.

This is a continuation in part of U.S. patent application Ser. No. 07/342,185 filed Apr. 24, 1989, now U.S. Pat. No. 4,967,956, which is a continuation in part of U.S. patent application Ser. No. 07/080,475 filed Jul. 31, 1987, now U.S. Pat. No. 4,824,017, which is a continuation in part of U.S. patent application Ser. No. 06/885,006 filed Jul. 14, 1986 now abandoned.

BACKGROUND ART

The present invention relates generally to multi-component spraying systems and, more particularly, to air-assisted, airless-atomization, plural component spraying systems and methods.

Multi-component spraying systems have been used, for example, in manufacturing plastic articles by applying resinous materials to a mold or preform for an article. In such systems, a liquid resin and a catalyst for the resin are formed into spray particles directed to a substrate where the catalyst and resin react and harden to form the article. In such applications, the resin and catalyst components are preferably mixed together; and the mixture is sprayed onto the substrate. For example, in manufacturing articles with polyester resin, a catalyzing agent for the polyester resin is mixed with the resin; and the resin-catalyst mixture is applied to the substrate. In internal mix systems, the resin and catalyst are mixed within the spraying apparatus; and the mixture is atomized by a spray nozzle and directed onto the substrate. In external mix systems, the resin and catalyst are mixed externally of the apparatus after the resin and catalyst have been atomized. In both external mix and internal mix systems, complete and thorough mixing of the resin and catalyst is important to avoid non-uniform hardening of the resin on the substrate and other undesirable results. Multi-component materials have also been used, for example, in the manufacture of insulating foams by mixing and spraying the components of a foam-producing combination onto a substrate where they produce a hardened foam-like coating. More recently, multi-component painting systems have been developed that include plural components that react, when mixed, to form hardened decorative and protective coatings. Multi-component spraying systems have thus a multiplicity of applications, each with its specific requirements.

In many spraying systems, large quantities of pressurized air are used to atomize the liquid components. Such systems are expensive to operate and have a number of operational inadequacies. It is expensive to compress air, and the large quantities of compressed air used by existing systems impose a significant operating cost on the system. In addition, the blast of compressed air used to atomize the liquid components carries a significant quantity of spray particles away from the substrate, wastes the expensive material, creates an unclean spray area and generally requires overspray collection systems and contributes to the problem of operating such manufacturing operations safely. Furthermore, the use of large quantities of air during operation of the system can often create an undesirable spread of fumes.

In order to overcome some of the inadequacies attending the use of pressurized air to atomize components dispensed from a spraying apparatus, spraying systems have been developed which incorporate airless atomization techniques.

In prior airless atomization devices, an airless spray nozzle has been used to atomize liquid materials which are pumped at high pressure, that is, pressures generally exceeding 500-600 psi and more frequently in excess of 800 psi, typical operating pressure being 1000-1500 psi. The most commonly used airless nozzle includes an internal, hemispherical passage termination which is cut through by an external, V-shaped groove to form an elongated, elliptical-like orifice. Liquid material pumped at high pressures through such a spray nozzle is forced by the hemispherical termination of the passageway to converge in its flow at and through the elongated orifice. Because of the converging flow at the orifice, the liquid material is expelled through the orifice into a planar, expanding, fan-like film which breaks into spray particles which are carried by their momentum to the article target.

With viscous fluids, high pressures of 1000-1500 psi are required. Such high operating pressures impose a strain on system components reducing their reliability, require generally expensive components in the fluid delivery systems and contribute to the problem of operating such systems safely. Even at high pressures, however, such fan-like films, because they are formed by the convergence of the fluid, include heavy streams at the edges of the planar, fan-like film, which are referred to as "tails". Because of the heavy streamlike flow in the tails, the spray pattern formed by these edge portions of the expanding, fan-like film includes a disproportionate quantity of material and produces a non-uniform deposit with stripes when the spray pattern is swept across a substrate by a spray gun operator. The non-uniform deposit and resulting stripes make the blending of deposited material into a film of uniform thickness virtually impossible.

Past efforts to solve the problem of the tails attending the use of airless spray nozzles have included the insertion of a "preorifice" immediately behind the elongated, elliptical-shaped orifice to concentrate a greater portion of the flow in the central portion of the fan. Although preorifices are helpful, they are not completely satisfactory, adding another source of clogging to the spray gun and another variable factor to be integrated into system operation.

Compressed air has also been used to solve the problem of tails created by airless spray nozzles. See, for example, U.S. Pat. No. 3,202,363; 3,521,824; 3,635,400; 3,843,052; and 4,386,739 and Japanese patent publication No. 57-90762. In plural component spraying systems, compressed air has been used to assist in the atomization of plural component materials as shown, for example, in U.S. Pat. Nos. 2,780,496; 2,864,653; 3,799,403; and 4,618,098 and British patent specification No. 735,983.

External mix plural component systems originally included a plurality of separated spray gun or spray nozzles that were directed to blend their patterns together and to mix thereby resins and their catalysts or hardening agents. See, for example, U.S. Pat. Nos. Des. 252,097; 3,893,621; 4,123,007; 4,618,098; and 4,713,257.

In prior art external mix, plural component spraying systems using airless resin nozzles, catalyst spray has been injected into the resin spray formed from an airless spray nozzle at distances on the order of one inch or more in front of the airless spray nozzle. This downstream location for insertion of the catalyst spray provided mixing of the catalyst spray particles with resin spray particles which had already been formed from the liquid resin at this location. In such prior plural component systems, resin spray particles are formed within a fraction of an inch of the airless spray nozzle, either under the influence of high hydraulic resin pressures, typically on the order of 1000 psi, or the combined action of lower hydraulic resin pressures and a plurality of compressed air jets located adjacent the airless resin nozzle and directed at the expanding fan-like resin film directly adjacent the liquid orifice of the resin nozzle. Introduction of the catalyst to the spray more than an inch downstream of the liquid orifice was to avoid the collection of catalyst on the resin nozzle, among other things. An accumulation of catalyst on the resin nozzle will combine with resin at the resin nozzle orifice and cure the resin, blocking the resin nozzle orifice and requiring removal of the resin nozzle for cleaning or replacement.

In such prior external mix systems, a substantial flow of air accompanied the rapidly moving resin particles at the downstream location of catalyst injection; and this substantial flow of air was transverse to the direction of the catalyst spray being injected into the spray pattern and made it difficult to inject catalyst particles uniformly into the resin spray. In addition, in such prior external mix systems, the catalyst particles were injected by the associated apparatus into a flow of compressed air that was directed to blow the catalyst particles into and mix them with the resin spray particles. The flows of air accompanying the formation of the resin particles and used to blow the catalyst particles into the resin spray produced uncontrolled billowing air movements which prevented the fine catalyst particles from being incorporated into the spray pattern and being mixed with the resin particles and deposited on the substrate. Importantly, the air flows associated with such prior external mix systems led to the escape of fine catalyst particles into the surrounding environment, thus presenting cleaning problems and requiring air removal systems.

Furthermore, in such prior external mix systems, it was difficult to obtain desirable spray patterns. The use of the plurality of compressed air jets to assist in atomization of the expanding resin film directly adjacent the liquid orifice of the airless nozzle, where the film had substantial integrity, resulted in a deflection of a portion of this compressed air and contributed to the uncontrolled billowing. This was especially true in systems in which the compressed air jets were directed against the airless nozzle itself. The focus of the compressed air jets at the airless resin nozzle to assist atomization of the resin film made it difficult to form resin and catalyst particles into a desirable spray pattern. Furthermore, because of the direction and force required of the compressed air to carry the catalyst particles into the resin spray more than an inch in front of the resin nozzle and to achieve mixing of the catalyst particles with resin particles substantially downstream of the resin nozzle, the compressed air used to entrain the catalyst particles was not effectively used to provide a satisfactory spray pattern.

Moreover, plural components spraying methods and apparatus have been encumbered by the use of large spray guns attached to a plurality of hoses. Such guns were heavy, and their manipulation was resisted by a plurality of hoses attached at various locations to the spray gun body. While the weight and dimensions and the inability to manipulate, by twisting and turning, the spray guns was no more than an inconvenience in the application of plural component materials to such large items as boats, shower stalls, roofs and the like, which are characterized by very large, relatively planar surfaces, they limited the applicability of the prior plural component spraying systems and apparatus to industrial painting applications in which a workman must frequently twist and turn the gun in all directions while holding it at arms length, and must frequently insert it into cavities and recesses formed in manufactured objects. These prior plural component systems and apparatus were, at least, commercially unattractive for industrial painting applications and, in many cases, unusable.

SUMMARY OF THE INVENTION

The invention includes method and apparatus providing effective and efficient mixing, atomization and deposition of plural component materials that is desirable not only in such plural component spraying applications as gel coat application in the manufacture of reinforced fiberglass articles but also to industrial painting applications. The method and apparatus of the invention provide a compact, well defined and easily used spray pattern with substantial containment of the plural component materials and reduced contamination of the work environment, an inexpensive, lightweight, easy-to-maneuver spray gun and a plural component spray system.

In one preferred method of the invention, connections for the plural component materials are adapted to be supported and carried on a workman's body, and the plurality of components of the plural component material flow to, and are combined at the connections supported and carried by the workman's body. The combined flow of the plural components is supplied from the connections supported and carried by the workman's body through a single flexible conduit to a spray gun for spraying on a substrate or article of manufacture. In preferred such methods, the combined flow of the plural components is further mixed and is preferably further mixed in the single flexible conduit leading from the connections on the workman's body to the spray gun. Preferred such methods also include cleansing of the apparatus of the mixed plural component material by providing a flow of solvent to one of the connections supported and carried by the workman's body, and providing a valve supported and carried by the workman's body and operable by the workman's hand, to interconnect, as desired the connections for the plural component material, or the connection for the solvent, to the output connection. In such methods, the valve is operated to place it in a first position in which the flow of solvent is blocked and the flows of the first and second components of the plural component material are permitted to flow through the connections and check valves to be combined in the valve and directed in a combined flow from the valve output connection, or in a second position in which the flows of the plural components are blocked and a flow of solvent is permitted through the connections and check valves and the valve and is directed by the valve through the valve output connection, the single flexible conduit and the spray gun.

In a preferred spraying method of the invention, a flow of compressed air is delivered to the spray gun and the combined flows of the plural component materials are mixed and formed into a fan-like film with expanding edges extending from the spray gun. A first flow of compressed air, having a greater width than depth, is directed to intersect the fan-like film of plural component materials within a fraction of an inch of the spray gun to assist in the formation of a particle spray. A second flow of compressed air is further directed from the spray gun to substantially confine the particle spray downstream of the intersection of the expanding air flow and fan-like film. The spray particles of mixed plural component materials are substantially confined in a spray pattern of reduced size that is directed at a substrate where the plural component materials form a coating.

The method and apparatus of the invention include a plural component supply means adapted to be supported and carried by the body of a workman. Such a means comprises a first connection adapted to receive a flow of one component of a plural component material, a second connection adapted to receive a flow of a second component of a plural component material and a third connection adapted to provide a combined output of the first and second components of the plural component material, all carried by means for attaching plural component supply means to the clothing of a workman, and preferably for attachment to a workman's belt. Such a plural component supply means preferably further comprises a fourth connection adapted to receive a flow of solvent and a valve connected with the first and second plural component connections, solvent connection and the third, or output, connection. The valve has a first position interconnecting the plural component material connections and the output connections while blocking the solvent connection, to permit a flow of combined plural component materials for spraying and a second position, blocking the plural component material connections and connecting the solvent connection to the output connection, to permit a flow of cleansing solvent through the output connection and remainder of the system.

The invention further includes novel valve comprising a valve body and a movable valve member that is carried within a cavity of the valve body and is movable between the first and second positions. The valve body has a first passageway leading from a first connection for fluid material to a first internal opening at the cavity of the valve body. A second passageway of the valve body leads from a second connection for fluid material to a second internal opening at the cavity of the valve body. A third passageway of the valve body leads from a third connection to a third opening at the cavity of the valve body, and a fourth passageway leads from a fourth connection to a fourth opening of the cavity at the valve body. The movable valve member is provided with a first valve passageway leading from the surface of the movable valve body to an internal passageway junction; a second valve passageway leading from the surface of the movable valve body to the internal passageway junction; and a third valve passageway leading from the surface of the movable valve body to the internal passageway junction. The passageways of the valve body and the movable valve member are so located at the surface forming the cavity of the valve body and the surface of the movable valve member that at the first position of the movable valve member, the first valve passageway is aligned with the first passageway of the valve body, the second valve passageway is aligned with the second passageway of the valve body and the third valve passageway is aligned with the third passageway of the valve body, thereby permitting fluid flow through the first and second passageways of the valve body and valve member to combine at the internal passageway junction of the movable valve member and to flow through the third passageways of the valve member and valve body to the third, or output, connection. In the second position of the movable valve member, either one of the first or second valve passageways to the valve member may be aligned with the fourth passageway of the valve body, the other of the first and second valve passageways being blocked by the cavity wall of the valve body, and the third passageway of the valve body is aligned with the third valve passageway thereby permitting fluid to flow through the fourth passageway of the valve body and one of the first and second valve passageways to the internal passageway junction and to flow through the third passageways of the valve member and valve body. Such a valve of this invention is preferably a ball valve that is rotatable between the first and second positions about the central axis of the third valve passageway. With such a preferred ball valve, the first and second valve passageways of the ball valve member share the same central passageway axis and form a "T" with the third valve passageway at the internal passageway junction of the ball valve member. Such a valve body is particularly adapted to be carried by a spray gun body with the third, or output, connection in communication with a fluid passageway of the spray gun. On such a spray gun, a small actuator can be connected to the movable valve member where it can be easily operated by a workman who selects spraying operations in which plural component materials connected to the valve flow through and are combined in the valve and are directed into the spray gun body, or cleaning operations in which the flow of plural component material is blocked and the flow of cleansing solvent connected to the valve body is directed through the valve and through the spray gun body. The valve is preferably adapted to be carried at the bottom of the handle of the spray gun and further adapted so that the connections for the plural component materials and solvent provide closely spaced hose connections that extend in a convenient direction.

The plural component spraying system of the invention thus comprises a first source of a first component of plural component material; a second source of a second component of a plural component material and means adapted to be supported and carried by the body of a workman, including a first connection adapted to receive a flow of the first component from the first source; a second connection adapted to receive a flow of the second component from the second source; and an output connection adapted to provide a combined flow of first and second components of the plural component material, and a hand spray gun adapted for connection to the output connection and for atomization and deposition of mixed plural component material.

In the preferred system a source of compressed air is provided and the spray gun is adapted for connection to the source of compressed air. The spray gun includes an airless liquid nozzle for forming the mixed plural component material into a fan-like film with edges extending from a liquid orifice and a nozzle assembly for directing a first flow of compressed air at the fan-like film and for further directing a second flow of compressed air downstream of the impingement of the first flow of compressed air so that the flows of compressed air interact with the mixed plural component material to assist in atomization and capture the particles of the mixture within the spray pattern. As indicated above, the system of the invention permits a plural component supply means supported and carried by the workman to be connected to the spray gun by a single flexible hose which can incorporate further mixing means for the combined flow of the plural component materials. A rotatable coupling can be provided between the single flexible hose and the handle of the spray gun to provide further ease in the manipulation of the spray gun. The plural component supply means supported and carried by the workman can be adapted for attachment to a workman's belt and can include a connection adapted to receive a flow of solvent from a source of solvent for the mixed plural component materials. In such a system, the plural component supply means can include the novel described above.

In such a preferred system of the invention, a flow of compressed air is directed at the planar surfaces of an expanding film of mixed plural component material from the opposite sides thereof to impinge upon the expanding film a fraction of an inch forwardly of the liquid orifice and a pair of compressed air flows is directed forwardly and generally parallel to each other and to the spray axis to impinge upon the expanding sides of the film forwardly of the impingement of the compressed air on the expanding liquid film. Surprisingly, when compressed air is directed at the expanding edges of the fan-shaped plural component film downstream of the impingement of the compressed air upon the expanding liquid film, the uncontrolled billowing flow of air and escaping particles are eliminated. In addition, spray pattern size is reduced; and an improvement in spray pattern uniformity results without the creation of escaping atomized plural component particles that have characterized prior air-assist, airless atomizing systems. The coaction of the flows of compressed air in the invention results in the capture of the plural component particles within the spray pattern.

The invention further permits more complete and effective atomization of the mixed plural component materials at liquid pressures and air volumes substantially lower than those commonly used in the prior art. Systems incorporated into the present invention, for example, may effectively operate with liquid pressures as low as 300–500 psi.

The invention thus permits an inexpensive, easily used painting system for plural component paints with minimal contamination of the workplace environment during its operation. Further advantages and specific details of the invention will be set forth hereafter in conjunction with the drawings and detailed description of the best modes of the invention.

BRIEF DESCRIPTION OF THE DRAWINGS

FIG. 1 is a perspective drawing of a system invention;

FIG. 2 schematically illustrates the system of the invention shown in FIG. 1;

FIG. 3 is an exploded view of a preferred plural component supply means of the invention;

FIGS. 4A and 4B are cut-away views of the preferred plural component supply means of FIG. 3A to show a preferred valve of this invention;

FIG. 5 is an exploded view of a preferred spray gun for use in gel coat and paint spraying operations;

FIG. 7 schematically illustrates an internal mix, air-assisted, plural component system of this invention;

FIG. 8 is a side view, partially broken away, of the spraying means of the system of FIG. 7;

FIG. 9 is a top view of the spray gun body of FIG. 8 partially in section;

FIG. 10 is a cross-sectional view of the head portion of the embodiment of FIGS. 8 and 9 taken at a vertical plane through its center;

FIGS. 11A and 11B are two orthogonal views of the nozzle assembly of FIGS. 5, 6, 7 and 10; and FIG. 12 is a front view of the nozzle assembly of FIGS. 11A and 11B.

DESCRIPTION OF BEST MODE OF THE INVENTION

Figure 6:
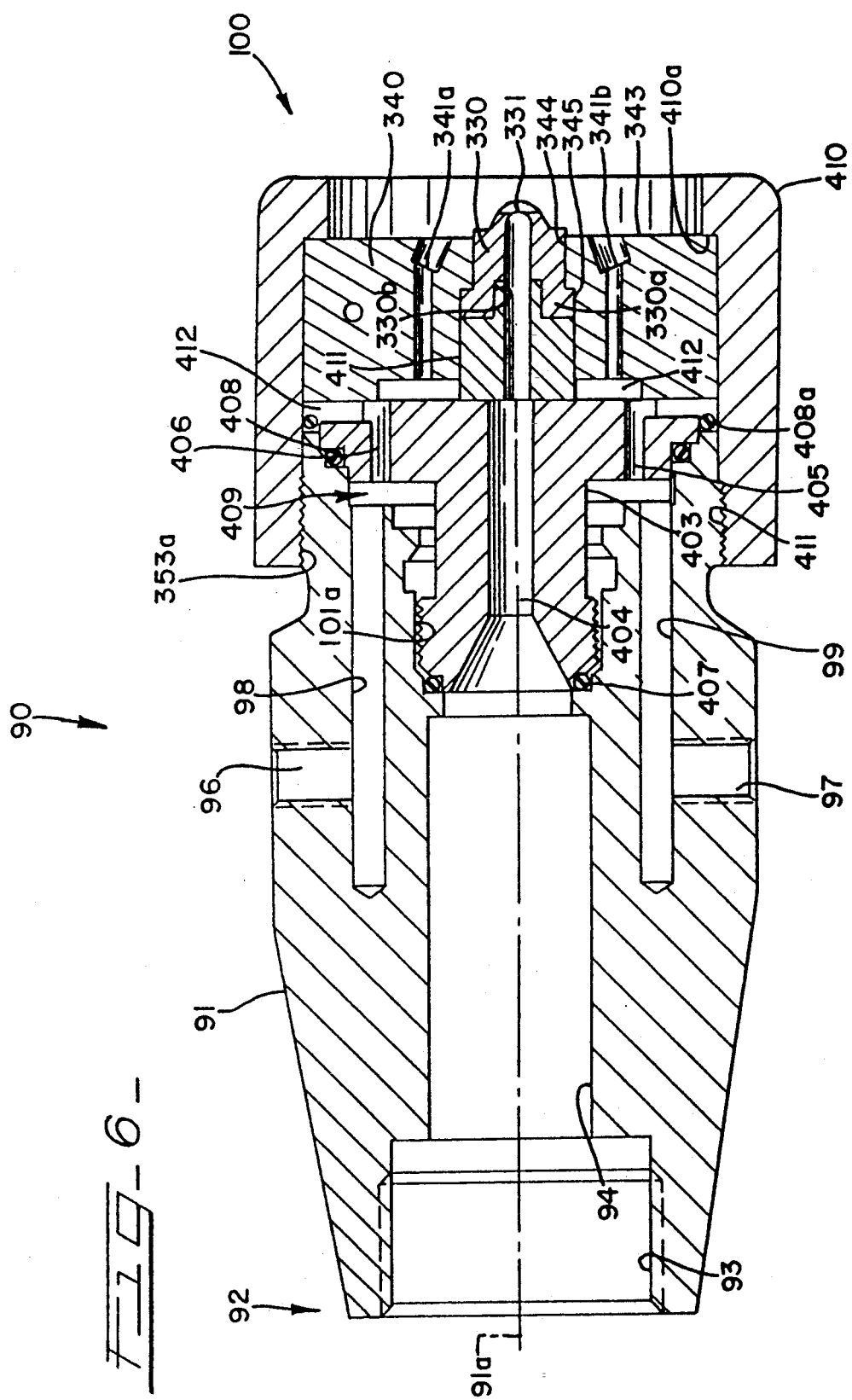
FIG. 6 is a cross-sectional view of the forward portion of the spray gun of FIG. 5 taken at a vertical plane through its center.

FIG. 1 is a perspective drawing of a system 10 of the invention. In FIG. 1, a workman is shown spraying the interior of a metal box 11 with mixed plural component painting material. As is typical in industrial painting applications, the metal box 11 is supported from an overhead conveyor 12 by a plurality of work holders 13 and carried past the workstation of the workman. As shown in FIG. 1, a plurality of such articles are generally carried in succession past the workstation by the overhead conveyor.

To satisfactorily coat an article such as metal box 11, it is necessary for the workman to manipulate the spray gun 14 to direct the spray pattern 15 at the inside surfaces of the box panels 11a–11e. For example, to coat the underside of panel 11a, it is necessary for the workman to twist and turn the spray gun 15 so that the spray pattern 15 is directed at and impinges on the under side of panel 11a. In like manner, the workman must also turn the spray gun to direct the spray pattern 15 at the insides of panels 11b and 11d and 11c. In order to economically coat the article 11, it is necessary that the workman coat the surfaces of the article with the thinnest sufficient coating material to cover the substrate with a uniform film. This requires the workman to manipulate the spray gun 14 easily in order that successive passes of the spray pattern 15 blend together and form a thin, uniform, coherent coating.

To permit such facility of operation in a plural component system, the system of the invention 10 includes a plural component supply means 20 adapted to be supported and carried on the body of a workman. As shown in FIG. 1, the plural component supply means 20 is preferably adapted for attachment to the workman's clothing and, more preferably, to the workman's belt. The plural component spraying system 10 includes a first source 21 of a first component of a plural component coating material and a second source 22 of a second component of a plural component coating material. The means 20 includes first and second connections (41, 42—FIGS. 2 and 3) adapted to receive flows of the first and second components of the plural component material from the first and second sources 21 and 22, respectively. The means 20 is adapted to provide a combined flow of the first and second components of the plural component material for direction to the spray gun 14. As shown in FIG. 1, the combined flow of plural component material is directed from means 20 through a single, flexible hose 23 to a connection 14a at the base of the handle of spray gun 14. Flexible hose 23 should be as short as possible to conserve cleansing time and material, but must be long enough to provide ease of manipulation; a hose length of 3.5 feet provides a satisfactory compromise. Connection 14a may be provided with a rotating coupling within between the spray gun 14 and the hose 23, as shown in FIG. 2, so that the spray gun 14 may be more easily manipulated by the workman.

The preferred system 10 of the invention further comprises a source of compressed air 24 and the spray gun 14 is adapted at 14b for connection with the source of compressed air 24. As will be further shown and described, the spray gun 14 includes an airless liquid nozzle for forming the mixed plural component material into a fan-like film with edges expanding from a liquid orifice and a nozzle for directing a first flow of compressed air at the fan-like film and for further directing a second flow of compressed air downstream the impingement of the first flow of compressed air on the fan-like film so that said flows of compressed air interact with the mixed plural component material to assist in the atomization of and capture the particles of the mixture in the spray pattern 15.

While the flows of the first component and the second component of the plural component material are combined by the plural component spray means 20, mixing means for the combined flow of the first and second components may be incorporated into the system downstream of means 20, preferably in flexible hose 23.

The preferred system 10 of the invention shown in FIG. 1 further comprises a source of solvent 25 and the plural component supply means 20 includes a connection adapted to receive a flow of such solvent. As shown and described below (FIGS. 2 and 4), means 20 preferably includes a valve connected with the connections for the first and second components of the plural component coating material, the connection for the solvent and the output for the single flexible hose 23. The valve of the plural component supply means 20 has a first position, interconnecting the flows of the first and second components with the output for flexible hose 23 and blocking the connection for the solvent, thereby permitting a flow of combined first and second components through the output for flexible hose 23, the spray gun 14 for deposition on the article. The valve further includes a second position blocking the flow of the plural component materials and connecting the connection for the solvent to the output connection for the flexible hose 23, permitting a flow of solvent through the valve, the flexible hose 23 and the spray gun 14 to permit removal of combined first and second components of the plural component material from the system. During operation of the system with the valve in the second position, the solvent and the plural component materials removed from the gun can be directed into a waste container 26 of a type approved for use within a spraying area by the workman.

As shown in FIG. 1, a preferred system of the invention also includes means 27 providing a plurality of individually controllable pumps for the first and second components of the plural component material and for the cleansing solvent and a plurality of controls for the pumps. In addition, if desired the apparatus 27 can include a pressure regulator for the compressed air directed to spray gun 14 and suitable dryers and other such apparatus commonly used in compressed air spraying systems.

FIG. 2 is a schematic drawing illustrating the system of the invention shown in FIG. 1. As shown in FIG. 2, the apparatus 27 can include a plurality of pumps driven by compressed air, which are controlled by controls of the apparatus. For example, an air-driven pump 31 can provide a flow of the first component of the plural component material to a first connection 41 of means 20, a second air-driven pump 32 can provide a flow of the second component of the plural component material to a second connection 42 of the means 20. A third connection 43 of means 20 can provide an output for the single flexible hose 23 leading to spray gun 14. A third air-driven pump 33 can deliver a flow of solvent to a fourth connection 44 of the means 20. Apparatus 27 can be provided with a control 34 which can include a pressure and flow regulator for each of the pumps 31, 32 and 33 so that each of the pumps 31, 32 and 33 may provide different rates of flow for the different fluids of the plural component system. Control 34 can also provide a pressure regulator to control the flow of compressed air from the compressed air source 24 through conduit 35 to the connection 14b of spray gun 14. As further shown in FIGS. 1 and 2, the first component of the plural component material may be delivered from pump 31 to first connection 41 of means 20 through a flexible conduit 36. The second component of the plural component material may be delivered from pump 32 to connection 41 of means 20 through a flexible conduit 37 and solvent may be delivered from pump 33 to the fourth connection 44 of means 20 through a flexible conduit 38.

FIG. 2 also schematically illustrates the means for attachment of the plural component supply means 20 to the body of the workman in its preferable form of means 45 for attachment of the means 20 to the belt of a workman. Such an attachment means can be a three finger clip to slip over a workman's belt, as shown in FIG. 2, or a spring-loaded fastener, or a pin, or other such fastening means.

Indicated schematically with dashed lines in FIG. 2 is the valve 50 preferably provided in means 20 and the actuator 51 to move the valve between the first and second positions as described above.

Means 20 and valve 50 are shown in greater detail in FIGS. 3, 4A and 4B described below. FIG. 3 shows an exploded view of plural component supply means 20 adapted to be supported and carried by the body of a workman. As shown in FIG. 3, the plural component supply means 20 comprises a first connection 41 adapted to receive a flow of the first component of the plural component material from the first source 21. In the preferred system of the invention, a flow of the first component is provided from source 21 by pump 31 through conduits 26 and 36 to the first connection 41. The plural component supply means 20 further comprises a second connection 42 adapted to receive a flow of the second component of the plural component material from the second source 22. As shown in FIG. 2, the flow of second component is provided by pump 32 through conduits 27 and 37 to the second connection 42. The plural component supply means 20 includes a third connection 43 adapted to provide a combined output of said first and second components of the plural component material. Plural component supply means 20 also includes a means 45 for attaching the plural component supply means 20 to the clothing of a workman. As indicated in FIG. 2, attachment means 45 is fastened to the plural component supply means 20 by a bracket portion 46. The attachment means, as shown in FIGS. 2 and 3, is adapted to attach the plural component supply means 20 to a belt of a workman and includes three fingers 48a, 48b and 48c. In attaching the plural component supply means 20 to a workman, the attachment means 48 is slid over the belt of a workman with its fingers 48a and 48c on one side of the belt and finger 48b on the other side of the belt so that the plural component supply means 20 is carried by the workman's belt.

As further shown in FIG. 3, the plural component supply means 20 is provided with a fourth connection 44 adapted to receive a flow of solvent. As shown in FIG. 2, the flow of solvent can be provided by pump 33 of apparatus 27 through conduits 28 and 38 to the fourth connection 44. The flow of solvent can also be provided from a pressure pot, as known in the art.

FIG. 3 also shows check valves 47 and 49 in the connections 41 and 42, respectively, for the first and second components. Check valves 47 and 49 include body elements 47a and 49a that form internal valve seats and are adapted to be fastened in the plural component supply means 20. Check valves 47 and 49 also include ball valves 47b and 49b that are retained in body elements 47a and 49a by roll pins 47c and 49c. In the event that one of the plural component materials would try to flow into the connection for the other plural component material, it would seat the ball valve against the valve seat formed by the body element of the check valve and flow through the check valve would be stopped. The embodiment of the plural component connection means shown in FIG. 3 is adapted to be connected with a source of resin at connection 41 and a source of catalyst at connection 42, and the catalyst connection 42 is provided with a restriction 42a for the flow of catalyst to reduce pulsation in the flow of catalyst as a result of pressure pulses due to pump operation. The restriction 42a may take many forms, but a preferable form is a conventional airless spray nozzle inserted into connection 42 as shown in FIG. 3; an airless spray nozzle having a 0.011 inch orifice and a spray angle of 40° provide a very effective restriction. The airless spray nozzle can be protected against clogging by a screen 42b having an appropriate mesh size.

As indicated above, means 20 preferably includes a valve 50 to control the flow of plural component material for coating operations and the flow of solvent for cleansing operations. The valve is movable by means of actuator 51 to a first position. In the first position, first connection 41 and second connection 42 are interconnected with the third connection 43, thereby permitting the first and second components of the plural component material to flow through means 20 and the valve 50 to be combined therein and flow outwardly through the third connection 43. In the first position, the flow of solvent through the fourth connection 44 (and the plural component supply means 20) is blocked the valve 50. When actuator 51 places the valve 50 in the second position, the valve 50 blocks flow of plural component material through the first connection 41 and second connection 42 and connects the fourth connection 44 with the third connection 43, thereby allowing a flow of solvent through connection 44, plural component supply means 20, valve 50 and third connection 43 to the flexible hose 23 leading to spray gun 14.

As indicated above, the invention includes valve 50 and its novel structure and means of operation. FIGS. 4A and 4B illustrate the valve 50 of this invention. As shown in FIGS. 4A and 4B, the plural component supply means 20 can be formed by a valve body 52 and a movable valve member 53 carried within a cavity formed by surface 52a of the valve body. The movable valve member is preferably a spherical valve member that is rotatable between the first and second positions thus providing the inexpensive, reliable ball valve structure. Although not shown in the drawings, the preferred ball valve structure of this invention is provided with seals for its operation in a manner well known to those skilled in the valve art. U.S. Pat. Nos. 3,675,895; 3,735,956; 4,026,516; and 4,685,488 disclose structures for sealing such valves.

As shown in FIGS. 4A and 4B, the valve body 52 is provided with a first passageway 61 which can lead from a first connection for fluid material, such as, the first connection 41 shown in FIG. 3. First passageway 61 leads to a first interior opening 61a at the cavity 52a of the valve body. The valve body is further provided with a second passageway 62 leading from a second connection which can be, for example, second connection 42 as shown in FIG. 3, to a second internal opening 62a at the cavity 52a of the valve body. The valve body can further be provided with a third passageway 63 leading from a third connection, such as, connection 43 of FIG. 3, to a third opening 63a at the cavity 52a of the valve body. The valve body 52 can be provided with a fourth passageway 64 leading from a fourth connection which can be, for example, connection 44 of FIG. 3, to a fourth opening 64a at the cavity 52a of the valve body. The movable valve member, or ball, 53 is provided with a first valve passageway 71, a second valve passageway 72 and a third valve passageway 73, all leading to an internal passageway junction 74. The valve body passageways 61, 62, 63 and 64 and the movable valve member passageways 71, 72 and 73 are located at the cavity-forming surface 52a of the valve body and the surface of the movable valve member 53 so that in the first position of the movable valve member, shown in FIG. 4A, first valve passageway 71 is aligned with the first passageway 61 of the valve body, the second valve passageway 72 is aligned with the second passageway 62 of the valve body and the third valve passageway 73 is aligned with the third passageway 63 of the valve body thereby permitting fluid materials, such as first and second components of the plural component material, to flow through the first and second passageways 61, 71, 62 and 72 of the valve body and valve member, respectively, to combine at the internal passageway junction 74 and to flow through the third passageways 73 and 63 to a third, or output, connection. In the second position of the valve member 53, shown in FIG. 4B, either one of the first and second valve passageways 71, 72 of the valve member 53 can be aligned with the fourth passageway 64 of the valve body and the other of the first and second valve passageways 71, 72 is blocked by the cavity wall 52a of the valve body 52. As shown in FIG. 4B, the second valve passageway 72 is aligned with the fourth passageway 64 of the valve body and the first valve passageway 71 of the movable valve member 53 is blocked by wall 52a of valve body 52. In the second position, the third valve passageway 73 is aligned with the third passageway 63 of the valve body, thereby permitting fluid flow, such as solvent, to flow through the fourth passageway 64 of the valve body, passageway 72 of the movable valve member 63 to the internal passageway junction 74, into passageway 71 and outwardly through the third valve passageway 73 and third passageway 63 of the valve body to the third, or output, connection. It is apparent by rotation of the valve body 53 through 90° clockwise and counterclockwise, passageways 71 or 72 of the movable valve member may be aligned successively with the fourth passageway 64 of the valve body with the remaining passageways being blocked.

As shown in FIGS. 4A and 4B, the movable valve member 53 is preferably rotatable about the central axis of the third valve passageway 73 so the third valve passageway 73 remains in alignment with the third passageway 63 of valve body 52. As is also shown in FIGS. 4A and 4B, the first and second valve passageways 71 and 72 of the movable valve member 53 preferably share the same central passageway axis and form a "T" with the third valve passageway 73 at the internal junction 74 of the movable valve member.

Where the valve 50 is used in a plural component spraying system, it is preferable that passageways 61 and 62 be used for the components of the plural component material. Passageways 61 and 62 can include check valves, such as check valves 47 and 49 shown in FIG. 3, to block flow of fluid materials from junction 74 outwardly through passageways 61 and 62. As shown in FIG. 3, such a check valve arrangement will prevent a curing agent of one plural component material from being forced outwardly from junction 74 into the connections to plural component supply means 20. Where size permits, check valves may be provided at the entrance of passageways 71 and 72 of the movable valve member. It will be apparent that by rotating actuator 51 through 90° from the first position, the internal passageways of valve 50 that contain combined components of the plural component material can be cleansed of the residue of any such components by a flow of solvent through the fourth passageway 64 and passageways 71, 72, 73 and 63 of the valve 50.

While it is preferable in plural component spraying systems that valve 50 be incorporated into the plural component supply means 20 supported and carried on the body of the workman, the valve 50 is particularly adaptable to be carried on the body 14 of the spray gun, preferably at the base of the handle. In such an adaptation, the valve body 52 is provided with a connector surrounding the third passageway 63 and the connector at third passageway 63 is attached to the base of the handle 14c of spray gun 14 at the position of connection 14a shown in FIG. 2. In such a position, the actuator 51a of the valve 50 can be easily operated by the workman to switch the operation of gun 14 from a spraying to a cleaning mode.

Where the plural component supply means 20 is carried by the body of the workman or where the valve 50 is carried at the base of the handle 14c of spray gun 14, it is preferable that the connections for the plural component materials and solvent provide closely spaced hose connections that extend in a convenient direction. For example, as shown in FIGS. 1 and 3, the first and second connections 42 and the fourth connection 44 can be grouped closely together and extend in such a direction that the hoses 36, 37 and 38 for the plural component materials and solvent, respectively, extend in a convenient direction which may be as indicated in FIG. 1 rearwardly from the workman. Where the valve body 50 is attached at the base of a handle 14c of the spray gun, a rotatable connection can be interposed between the passageway 63 of the valve body and the internal passageway of the spray gun. It is, of course, not necessary that the valve 52 be attached at the base of the handle of the spray gun, it may, of course, be attached at the forward portion 14d of the spray gun if the fluid passage of the spray gun is restricted to the forward portion thereof.

It is apparent that the invention provides an improved plural component spraying method applicable to many plural component spraying operations and provides a substantially improved apparatus and method for spraying plural component paints. The plural component spraying method of the invention includes the steps of providing connections of plural component materials and supporting and carrying the connections on a workman's body, providing a flow of a first component of a plural component material at a first one of the connections and a second flow of plural component material at a second one of the connections, combining the flows of first and second components of plural component material at the location of the connections supported and carried by a workman's body and providing a combined flow of the first and second components from a third one of the connections through a single flexible conduit to a spray gun. In the method, the combined flow of the first and second components can be exposed to further mixing at any time after their combination, and preferably the combined flow of first and second components is mixed between the connections at the body of the workman and the spray gun within the interconnecting flexible conduit 23a as indicated in FIG. 2.

The method of the invention permits convenient cleansing of the system of mixed plural component materials by providing a flow of solvent for the components of the plural component material to a fourth one of the connections supported and carried by the workman's body and by providing a valve supported and carried by the workman's body and operable by the workman to interconnect either the plural component connections, or the solvent connection, and connection to the spray gun for either spraying operations or cleansing. In the method, the valve is operated by the workman to place it in the first position in which a flow of cleansing solvent is blocked and the first and second components of plural component materials are permitted to flow through the valve and the connections to be combined in the valve and directed in a combined flow through the output connection, the flexible interconnecting conduit and the sprayer for spraying operations, and to place it in a second position in which the flows of plural component materials are blocked and the flow of solvent is permitted through the solvent connection and the valve and is directed through the output connection, the flexible interconnecting conduit and the spray gun to cleanse the system.

As shown in FIG. 5, a preferred spray gun for gel coat operations and industrial painting operations is a small, lightweight, maneuverable spray gun which is adapted for substantially effortless manipulation by means of its handle. FIG. 5 shows such a spray gun in an exploded view. The spray gun includes a handle member 80 which is hollow and can be provided with, if advisable, a static mixing means 81. The handle member 80 is threaded into a main gun body 82 that includes a further fluid passageway 82a and carries a trigger-like valve actuator 83 and is designed interiorally of the fluid passageway 82 to support a movable valve member 84. Valve member 84 is adapted to provide sealing engagement with the main valve body 86 and to be held in gun body 82 by a fastener 85. Valve member 84 is actuated by the trigger actuator 83 which pivots on an axle 82b carried in a bore 82c that is formed in the gun body 82 more valve actuating rods 87 and 88. Threaded onto the forward part of main valve body 86 is a forward gun body portion 90 which forms a part of the method and apparatus of this invention as set forth below. The portion of the spray gun represented by members 80 through 89 are adapted from the prior art.

FIG. 6 shows the forward portion 90 of spray gun 14. As shown in FIG. 6, the forward portion 90 includes a body 91 adapted at its rear end 92 for threaded attachment to the threaded main valve body 86, which itself fastens valve member 84 and trigger guard 89 to the gun body portion 82 and provides a valved internal opening (not shown) for valve member 84. Rear end 92 of the body 91 includes a threaded bore 93 adapted to be threaded onto the threaded external portion of part 86. The rear portion 92 of body 91 also includes an enlarged central bore 94. The enlarged bore 94 is adapted to accept a fluid material strainer 95 and a static mixer 95a, as shown in FIG. 5, within the body 91. Bores 93 and 94 communicate with the liquid passageway of the spray gun body and direct mixed plural component material forwardly to the spray forming means 100 held by threads on the forward portion of body 91. Spray forming means 100 is shown in FIG. 6 in a position to form a spray pattern with its long dimension extending vertically. Body 91 further comprises a pair of bores 96 and 97 extending transversely of the body, each intersecting one of another pair of bores 98 and 99, respectively, that extend parallel to the bore 94 and the central body axis 91a. Either passageway 96 or 97 can be used for the connection 14b and the attachment of compressed air to the forward portion of spray gun 14. The unused passageway, either 96 or 97, would be blocked by a threaded plug 96b, as shown in FIG. 5. As shown in FIG. 6, spray forming means 100 comprises a threaded fitting 403 which is threaded into a threaded bore 101a formed in the forward portion of body 91. An O-ring seal 407 is compressed between threaded member 403 and the surface of the body 91 to provide a sealed engagement of bore 404 and threaded member 403 with the bores 94 and 93 of spray gun body 91. When threaded fitting 403 is threaded into body portion 91, fitting 403 compresses O-ring seals 407 and 408 against body portion 91 and forms an annular air chamber 409 between body portion 91 and fitting 403 and seals the interface between passageway 94, body portion 91 and passageway 404 of threaded fitting 403 and also seals the interface between passageways 98 and 99 of body portion 91, annular air chamber 409 and passageways 405 and 406 of threaded fitting 403. The nozzle assembly 100 is attached to body portion 91 of spray gun 14 with a threaded nut 410. Nozzle assembly 100 includes an airless liquid nozzle 330 and an air nozzle 340. Liquid nozzle 330 forms plural component material flowing through passageways 93, 94 and 404 into a fan-like film with expanding edges extending from the liquid nozzle 331 formed in nozzle 330. Air nozzle assembly 340 forms a controlled first flow and a controlled second flow of air through a plurality of air orifices in the nozzle assembly. Air nozzle assembly 340 includes in its preferred embodiment a plurality of air orifices 341a, 341b and a plurality of nozzles 342a and 342b (see FIGS. 11A, 11B and 12). Nozzles 342a and 342b form the compressed air flowing therefrom into an air stream having greater width than thickness. Nozzle assembly 100, including liquid nozzle 330 and air nozzle 340, forms a plural component material having a spray pattern which has uniform distribution of spray throughout the pattern along its longitudinal axis and without escaping spray particles. The spray pattern is substantially smaller than spray patterns obtained with prior systems and may be conveniently used by a workman operating spray gun 14 to provide easily, a thin uniform coating on an article of manufacture. A more detailed explanation of the structure and operation of the nozzle assembly 100, that is, the manner in which threaded member 403, liquid nozzle 330 and air nozzle 340 combine in providing improved spraying operations is set forth below in conjunction with the following discussion of a preferred internal-mix plural component spraying system for spray-up operations. Nozzle assembly 100 is identical to nozzle assembly 318 which is described below.

FIGS. 7–12 illustrate a preferred embodiment of an internal mix, plural component spraying system of this invention for the manufacture of plastic articles.

FIGS. 7–10 illustrate a preferred embodiment of a hand-held, spraying means 313. The hand-held spraying means 313 preferably comprises a spray gun body 317 with a nozzle assembly 318 at its front. Spray gun body 317 and nozzle assembly 318 are described in substantially more detail below.

The embodiment of FIGS. 7–10 shows the nozzle assembly 318 adapted for use without a chopper, that is, its spray pattern is oriented vertically. Spraying means 313 may be fitted with a chopper 500 by attaching it to spray gun body 317 by means of a bolt fastener 311 at the top of spray gun body 317. When spray means 313 is used with a chopper, the nozzle assembly is oriented to provide a horizontal oriented spray pattern. When a chopper is used in conjunction with spraying means 313, a flexible air hose 501 connects opening 502 at the top of spray gun body 317 to the chopper. When a chopper is not used with spraying means 313, hole 502 is plugged with a threaded closure.

FIG. 7 schematically illustrates an internal mix, air-assisted, airless atomization, plural component spraying system of the invention. The system is generally designated by reference numeral 300 and includes a first source 311 of a first component, e.g., a resinous material; a second source 312 of a second component, e.g., a catalyst for the resinous material; spraying means 313 for mixing the catalyst and resin and for directing the mixture at a substrate 114; and delivery means 316 for delivering the resin, catalyst and compressed air to the spraying means during operation of the system.

Spraying means 313 is shown in FIGS. 8–12 and preferably comprises a hand-held gun which includes a spray gun body 317 with a nozzle assembly 318 at its front. Spray gun body 317 incorporates a mixer 318a to mix the resin and catalyst within spray gun body 317. Nozzle assembly 318 comprises an air-assisted, airless atomization nozzle assembly in which compressed air and liquid pressure are combined in the spraying of the mixed resin and catalyst. Thus, system 300 includes a compressed air source 319. Delivery means 316 includes means 321 for delivering the resin, including a resin pump 322 and resin conduit 323, between the source of resin 311 and the spray gun body 317; means 324 for delivering catalyst, including a catalyst pump 325 and a catalyst conduit 326, between the source of catalyst 312 and the spray gun body 317; and means 327 for delivering compressed air, including a compressed air control 328 and an air conduit 329, between compressed air source 319 and spray gun body 317.

As described below, a flow of resin from resin source 311 and a flow of catalyst from catalyst source 312 are delivered to spray gun body 317 where they are mixed by mixer 318a and directed as a mixture of catalyst and resin to nozzle assembly 318 which creates a spray of resin-catalyst particles for direction to a substrate 314. Nozzle assembly 318 includes an airless spray nozzle to which the mixed resin and catalyst are directed and which forms the mixed resin and catalyst into a fan-like film. Nozzle assembly 318 also includes a plurality of compressed air nozzles to coact with the airless spray nozzle to assist in atomization of the resin-catalyst mixture, particularly the tails of the fan-like resin-catalyst film formed thereby, and to capture the particles of resin and catalyst within the resulting spray pattern. Thus, mixed resin and catalyst can be applied to substrate 114 where it solidifies to form an article of manufacture. Substrate 114 can be a mold for an article, such as a boat hull, boat part, shower stall or the like. Any one of a number of resins and catalysts can be used in systems of this invention.

System 300 may, of course, include a chopper 500 carried by spraying means 313 to dispense strands of fiberglass or the like into spray pattern 331, as shown at 332, to reinforce the article of manufacture formed on substrate 314.

FIGS. 8-10 illustrate spraying means 313 including spray gun 317 and 318 in greater detail. As shown in FIG. 8, spray gun 317 includes a body portion 351, a handle portion 352 and a head portion 353. A trigger 354 is movably attached to body portion 351 by an axle or pin 356.

The rear face of body portion 351 of spray gun body 317 defines a mounting platform 357 having a plurality of openings 61, 62 and 63 formed therein (see FIG. 9). Openings 61-63 comprise inputs to a plurality of passageways within spray gun body 317 through which resin, catalyst and compressed air flow in operation of the spray gun. Resin conduit 323 is connected to opening 361; catalyst conduit 326 is connected to opening 363; and air conduit 329 is connected to opening 362. A fourth opening 364 permits a cleansing solvent to be forced through spray gun 317 to cleanse it of mixed resin and catalyst and prevent mixed resin and catalyst from curing within spray gun 317 and preventing its operation. A solvent pump 367 delivers solvent from a solvent source 368 through a solvent conduit 369 connected to opening 364. As shown in FIG. 8, platform 357 is angled at about 30°-60° to conveniently connect spray gun 317 to conduits 323, 326, 329 and 369.

As shown in FIG. 8, catalyst is delivered through catalyst conduit 326 and opening 363 into passageway 365, and a control valve assembly 366. Resin is delivered through resin conduit 323 and opening 361 into passageway 370 (shown in phantom in FIG. 9) to a valve assembly (not shown) which is like valve assembly 366 but is located on the opposite side of spray gun body 351 generally in line with opening 361. Compressed air is delivered through air conduit 329 and opening 362 into passageway 371 (shown in phantom in FIG. 8) to a fluid valve assembly (not shown) which is like valve assembly 366 but is located between the other two valve assemblies so that all three valve assemblies may be actuated by activation of trigger 354.

Upon activation of trigger 354, resin is permitted to flow from passageway 370 into passageway 372 (both of which are shown in phantom in FIG. 9) which opens at opening 373 into passageway 374, as shown in FIG. 8.

Opening 373 is closed by a check valve 375 threaded into the spray gun body 351 until actuation of trigger 354 permits the hydraulic resin pressure from resin pump 322 to force resin into passageway 372 (FIG. 9) and through check valve 375 to passageway 374. Actuation of trigger 354 also permits catalyst to flow from passageway 365 into passageway 376 and passageway 374 (FIG. 8). Resin and catalyst flow through passageway 374 into tubular member 379 which contains mixer 318a where the resin and catalyst are mixed. Mixer 317 may be any commercially available static mixer of the type manufactured, for example, by TAH Industries, Inc., of Imlaystown, N.J. 03526 and sold as Stata-tube Part No. 5-3P. As shown in FIG. 9, the mixture of resin and catalyst flows from tubular member 379 into passageway 381 of head portion 353 of spray gun body 351. Passageway 381 opens into a bore 382 formed in head portion 353 at opening 383 (see FIGS. 9 and 10). As will be described below with respect to FIGS. 10-12, the resin-catalyst mixture will be forced from cavity 382 through the nozzle assembly 318.

Upon actuation of trigger 354, compressed air is permitted to flow from passageway 371 through passageways (not shown) formed in spray gun body 357 to the head portion 353. FIG. 10 illustrates in cross-section head portion 353 of spray gun body 351 with nozzle assembly 318 attached. As those skilled in the art will recognize, head portion 353 will be held to spray gun body 351 by means of the threaded extension 384 and a nut 385 (FIG. 8). When so attached, passageway 386 of head portion 353 will be sealed in communication with the compressed air passageways of spray gun body 351. Compressed air will be delivered, upon actuation of trigger 354, into passageways 386 and 387. Head portion 353 is also provided with means forming an air control for nozzle assembly 318; such air control means is provided in bore 400 which includes a valve seat 401 and a threaded portion 402. As shown in FIG. 8, a valve member 401a threaded into bore 400 can be used to adjust the flow of compressed air from passageway 387 through valve seat 401 into passageway 388.

FIG. 10 also illustrates opening 383 through which the resin-catalyst mixture flows in cavity 382. As shown in FIG. 10, cavity 382 is provided with a threaded fitting 403 which includes a central passageway 404 in communication with cavity 382 and a plurality of passageways 405 and 406. When threaded fitting 403 is threaded into head portion 353, fitting 403 compresses O-ring seals 407 and 408 against head portion 353 and forms an annular air chamber 409 between head portion 353 and fitting 403 and seals the interface between cavity 382 and passageway 404 and the interface between passageway 388, annular air chamber 409 and passageways 405 and 406.

Nozzle assembly 318 is attached to the head portion 353 of spray gun 317 which a threaded nut 410.

In operation, spraying means 313 provides an expanding flow of mixed resin and catalyst which may be directed by the system operator onto a substrate 114, which may be a mold or preform used to manufacture articles of varied shape. Spraying means 313, assembled as shown in FIG. 10, is used without a chopper to form a smooth, catalyzed resin film on substrate 114. Such smooth, non-reinforced resin films are frequently referred to as being a "gel coat" and provide a smooth article surface. When spraying means 313 is used to spray gel coat, the nozzle assembly 318 provides a vertically oriented spray pattern. If further strength is required in the manufactured article, spraying means 313 may be operated with a chopper to introduce into the catalyst-resin spray reinforcing fibers of selected length into a layer of catalyzed resin deposited over the gel coat on the substrate. These fibers are preferably chopped fiberglass as described above. Upon completion of each use and before allowing spraying means 313 to be idle for any significant time, the interior passageways of spraying means 313 exposed to mixed resin and catalyst are flushed with solvent from solvent source 368. A small, manually operated valve 369a can be mounted on the rear of spraying gun body 317 to permit convenient control of the solvent flush by the gun operator.

As set forth above, FIG. 10 is a cross-sectional view of head portion 353 of spraying means 313 with nozzle assembly 318 attached. The cross-sectional view of FIG. 10 is viewed at a vertical plane through the center of nozzle assembly 318. Nozzle assembly 318 includes an airless liquid resin nozzle 330 and an air nozzle 340. Liquid nozzle 330 forms the resin flow into a fan-like film with expanding edges extending from a liquid orifice 331 formed in nozzle 330. Air nozzle 340 forms a controlled flow of air through a plurality of air orifices 341a, 341b and a controlled flow of air from a plurality of nozzles 342a and 342b (see FIGS. 11A and 11B). Nozzles 342a and 342b form the compressed air flowing therefrom into an air stream having greater width than thickness. Nozzle assembly 318, including liquid nozzle 330 and air nozzle 340, forms a resin-catalyst mixture having a spray pattern which has a uniform distribution of spray throughout the pattern along its longitudinal axis and without escaping catalyst particles. The spray pattern is substantially smaller than the spray patterns obtained with prior systems and may be conveniently used by an operator of spraying means 313 to provide a uniform, catalyzed, resin film on a substrate, mold or preform.

FIG. 10 shows how nozzle assembly 318 is assembled onto head portion 353 of spray gun body 317. As shown in FIG. 10, spray nozzle 330 is held onto head portion 353 of the spray gun body by air nozzle 340 and a threaded retainer nut 410. Retainer nut 410 includes a threaded portion 411 at its rear which threads onto a threaded portion 353a at the forward end of head portion 353. At its forward portion, retainer nut 410 forms an inwardly projecting flange 410a which engages the front face 343 of air nozzle 340, urging it rearwardly and tightly against the front face of threaded member 403 of the spray gun body. Air nozzle 340 is formed with a central opening 344 which is shaped to include two flat surfaces 344a and 344b (see FIG. 12). Opening 344 fits around liquid nozzle 330. A rearwardly facing flange 345 is formed around central opening 344; and as the retaining nut 410 is threaded onto the head portion 353 of the spray gun and its rearwardly facing flange 410a engages the front face 343 of air nozzle 340 and urges air nozzle 340 rearwardly, flange 345 of air nozzle 340 presses liquid nozzle 330 rearwardly into engagement with sealing means 411 and threaded member 403. As shown in FIG. 10, sealing means 411 is preferably formed with a forward portion of reduced diameter to fit within an enlarged cavity 330b at the rear of liquid nozzle 330. Sealing means 411 can thus be sealingly engaged between liquid nozzle 330 and threaded member 403. Thus, as retaining nut 410 is threaded onto head portion 353 of the gun body, it simultaneously fastens the air nozzle 340 and liquid nozzle 330 to gun body portion 353 and seals, by means of seal means 411, between liquid nozzle 330 and air nozzle 340 and between liquid nozzle 330 and threaded member 403. Body portion 403 comprises a generally cylindrical-shaped component of aluminum or stainless steel having a central passageway 404 extending from its front face longitudinally into, but not through, its body.

When trigger 354 is pulled rearwardly, opening the valve assemblies, the resin-catalyst mixture flows under the influence of pressure imparted by pumps 323 and 325 through opening 383, cavity 382, passageway 404, sealing means 411, liquid nozzle 330 and opening 331 therein. Liquid nozzle 330, an airless atomizing nozzle, includes an interior passageway formed to force the resin to flow into a fan-like film with expanding edges extending forwardly from liquid orifice 331a.

Threaded member 403, when in place in cavity 382 formed in head portion 353 of the spray gun, also forms an air passage to deliver a flow of compressed air to the plurality of air orifices in the front of the air nozzle 340. As shown in FIG. 10, when air nozzle 340 is attached to the spray gun, a second annular air chamber 412 is formed between the forward face of threaded member 403 and air nozzle 340. Threaded member 403 includes a plurality of passageways (405, 406, FIG. 10), preferably four, extending forwardly from its rear face at the first annular air chamber 409 to its forward end where the plurality of passageways (405, 406) opens into the second annular air chamber 412 formed between threaded member 403 and air nozzle 340. A plurality of air passageways extends from the rear air nozzle surface that communicates with the second annular air chamber 412 to orifices 341a and 341b and nozzles 342a and 342b at the front face 343 of air nozzle 340 (Fib. 11B). Compressed air, which is controlled by a valve assembly in spray gun body 317, is directed through passageways which are not shown in spray gun body 317 to the interface between head portion 353 and the front portion of spray gun body 351. As shown in FIG. 10, when trigger 354 is operated, the compressed air flows from source 319 and compressed air control 328 (FIG. 7) through conduit 329, opening 362, passageways 371 and others in gun body 317 (not shown), passageways 386, 387 and 388, the first annular air chamber 409, the plurality of passageways 405, 406, the second air chamber 412 and the passageways 341c and 341d and the plurality of nozzles 342a and 342b formed in air nozzle 340.

Thus, as shown in FIGS. 10, 11A and 11B, compressed air flows through annular air chamber 412 into passageways 394, 395a and 396a (see FIGS. 11B and 12) drilled into the main body of air nozzle 340. Passageways 395a and 396a intersect within the body of spray nozzle 340 with passageway 394 and are closed at the peripheral surfaces of the body. As shown in FIG. 11B, compressed air is directed via passageways 397a and 398a which intersect passageways 395a and 396a,respectively, to the plurality of air nozzles 342a and 342b. Air nozzles 342a and 342b direct an expanding air stream at the expanding, fan-like flow of resin and catalyst from the liquid nozzle 330 which is positioned in central opening 344, as described below. Central opening 344 of nozzle assembly 340 includes two flattened portions 344a and 344b (see FIG. 12) to ensure that nozzle assembly 340 is properly aligned with airless nozzle 330. Compressed air thus flows through passageways 394, 395b and 396b to passageways 397b and 398b, respectively, and to air nozzles 342a and 342b and through passageways 341c and 341d. Air nozzles 342a and 342b may be pressed into the body of nozzle assembly 340 or may be fastened therein by any convenient fastening method.

Nozzle assembly 340 surrounds airless nozzle 330, which preferably forms a fan-like film with an included angle R of 40°-50°; and the airless nozzle is located within opening 344 at the longitudinal center line of nozzle assembly 340. Air nozzles 342a and 342b formed by the nozzle assembly are located on a plane that is perpendicular to and bisects the expanding, fan-like liquid film formed by the airless nozzle. Air nozzles 342a and 342b are oriented to direct their expanding flow of compressed air at an acute, included angle a with respect to the expanding, fan-like liquid film to impinge upon the expanding fan-like film at a distance of from about five-tenths to about eight-tenths of an inch forwardly of the orifice 331 of the airless nozzle 330. Such orientation prevents a troublesome accumulation of particles on the airless nozzle. In the embodiments illustrated in FIGS. 11 and 12, air nozzles 342a and 342b can be equally spaced from the center line of the liquid orifice 331 of the airless nozzle by a distance c of about three-eighths of an inch to about one-half of an inch and directed to form equal acute included angles a of about 25° to about 35° with respect to a plane containing the expanding fan-like liquid film.

The flow of compressed air in the illustrated embodiments of FIGS. 11 and 12 is also formed by two passageways 341c and 341d parallel to both the longitudinal axis of a nozzle assembly and to each other. Two passageways 341c and 341d are equally spaced from the central axis of the airless resin nozzle a distance e of about three-tenths to about four-tenths of an inch and lie in the plane that perpendicularly bisects the plane through the center of the catalyst spray nozzles. Where in one preferred embodiment using a resin nozzle with a nominal included angle R of 40°-50°, the distance c was about 0.458 inch; the angle a was about 30°; and the distance e was about 0.375 inch.

In addition, as shown in FIG. 11A, a pair of cavities 346a and 346b may be formed in the front face 343 of nozzle assembly 340 around air orifices 341a and 341b, respectively. Cavities 346a and 346b are formed in the front face 343 in such a manner that they extend inwardly at an acute angle with respect to air passageways 341c and 341d, respectively, but in such a manner that there are no surfaces forwardly of the air orifices 341a and 341b that lie within the imaginary extension of the air passageways 341c and 341d. Cavities 346a and 346b tend to form low-pressure areas adjacent the air orifices 341a and 341b which "soften" the edges of the compressed air jets projected from orifices 341a and 341b as the compressed air jets extend forwardly from the front face 343 of the air-catalyst nozzle. The acute angle j formed by the central axis of cavities 346a and 346b and the longitudinal axis of air passageways 341c and 341d may vary; with the specific embodiment described above, effective operation can be obtained with cavities 346a and 346b lying at an angle j equal to about 20° if the cavities have a diameter of about 0.138 inch and a depth of about 0.118 inch; and the diameter of air passageways 341c and 341d is about 0.062 inch.

In the absence of the flow of compressed air which characterizes this invention, the spray pattern of the liquid from an airless nozzle 330 includes a central portion having a high ratio of length to width and tapering ends, and two end portions at each edge of the pattern characterized by almost circular cross-sections and a heavy deposition of resin material. The air of this embodiment directed at the fan-like resin film from air nozzles 342a and 342b, in the absence of the compressed air flows from orifices 341a and 341b, substantially widens the spray pattern, increasing the ratio of length to width of the central portion without diminishing the concentration of liquid deposition at the end portions of the pattern and, further, results in an air billowing which carries fine resin-catalyst particles away from the spray pattern into the surrounding environment. With the flow of compressed air from orifices 341a and 341b directed at the expanding edges of the fan-shaped liquid film downstream of the impingement of the air from nozzles 342a and 342b, the uncontrolled billowing of air and escaping particles is eliminated and a surprising improvement in the size and uniformity of the spray pattern results.

FIGS. 11A and 11B present an illustration of the arrangement of compressed air nozzles of air nozzle 340. The liquid nozzle forms the resin into a fan-like film having expanded edges forming an angle R, shown in FIG. 11A; in the preferred embodiments, R equals about 40° to 50°. Air passageways 341c and 341d lie preferably along axes parallel to each other and perpendicular to front face 343 of air nozzle 340. The central axes of air passageways 341c and 341d are displaced from the center line of nozzle assembly 340 and the liquid orifice 33 at such a distance that the center axes of the passageways 341c and 341d intersect the expanding edges of the liquid film that form the included angle R downstream of the intersection of the air spray from air spray nozzles 342a and 342b. Thus, for preferable operation, the distance e (the separation between the center line of air passageways 341c and 341d from the center line of liquid orifice 331) divided by the tangent of one-half of the angle R (the included angle formed by the expanding fan-like liquid film) is greater than the distance c (the separation between the center line of the air spray nozzle orifices and the center line of liquid orifice 331) divided by the tangent of a (the acute angel between a line parallel to the central axis of airless nozzle 330 and the center axes of air nozzles 342a and 342b. In mathematical terms:

$$\frac{e}{\tan\frac{R}{2}} > \frac{c}{\tan a}$$

In systems of the invention, the flow of compressed air is thus directed at the fan-like liquid film closely adjacent (i.e., directly at or a fraction of an inch in front of) the airless nozzle and at the expanding edges of the fan-like film downstream of the impingement of the air on the liquid film.

The air nozzle shown in FIGS. 11A, 11B and 12 can thus provide combined flows of compressed air to assist the atomization of a plural component material mixture directed from an airless atomizing nozzle and to capture the resulting spray particles in a small spray pattern for deposition on a substrate. The spraying system of this invention is thus advantageously applied not only to resin-catalyst systems for the formation of fiber reinforced plastic products such as boats, shower stalls and the like, but to plural component painting systems for industrial applications. The invention also provides high volume, low pressure (HVLP) rated guns with pressures as low as 10 pounds per square inch at the air orifices.

Such systems provide substantially improved spray patterns. Systems of this invention are less expensive to manufacture, operate and maintain and are easier and safer to use through their improved spray patterns, and permit reductions of hydraulic pressure and compressed air pressure and more effective use of compressed air, and are more easily cleaned and manipulated than prior systems. Such systems can provide improved operation with hydraulic pressures substantially less than 500 psi and with air pressures of about 30 psi and less.

While what has been described constitutes a presently most preferred embodiment, the invention can take many other forms. Accordingly, it should be understood that the invention is to be limited only insofar as is required by the scope of the following claims.

We claim:

1. A spraying system for forming a coating on an article, comprising:
   a source of coating material;
   spraying means for directing the coating material at the article;
   liquid delivery means for providing a flow of said coating material from said source to said spraying means;
   a source of compressed air; and
   air delivery means for providing a flow of compressed air from said compressed air source to said spraying means,
   said spraying means including an airless liquid nozzle for forming the coating material into a fan-like film with edges expanding from a liquid orifice, and a nozzle assembly for directing a first flow of compressed air to impinge on the fan-like film closely adjacent to the airless liquid nozzle and assist in the formation of a particle spray, and for directing a second flow of compressed air to substantially confine the particle spray downstream of the impingement of the first flow of compressed air,
   - said first flow from said nozzle assembly comprising two flows of compressed air directed from opposite sides of the fan-like film, and said second flow of compressed air comprising two parallel flows of compressed air directed at the expanding edges of the fan-like film downstream of the impingement of the first flows to assist in the formation of and substantially confine the particle spray, said first and second flows of compressed air interacting with the fan-like film of coating material to assist atomization and capture of the spray particles.

2. The spraying system of claim 1, wherein said source of coating material comprises:
   - a source of a first component of said coating material, including a first hose for delivery of said first component; and
   - a source of a second component of said coating material including a second hose for delivery of said second component, said spraying system further comprising
   - a source of solvent, including a third hose for delivery of said solvent, and
   - means for supporting said first, second and third hoses and for controlling said first and second components and said solvent, said supporting and controlling means being adapted to be carried on the body of a workman and including a first connection adapted to carry said first hose and receive a flow of said first component, a second connection adapted to carry said second hose and receive a flow of said second component and a third connection adapted to carry said third hose and receive a flow of said solvent, a valve means for said first and second components and solvent and an output connection from said valve means adapted to provide a combined flow of said first and second components or a flow of said solvent to said spraying means.

3. The spraying system of claim 2 wherein said output connection and said spraying means are interconnected by a single flexible hose.

4. The spraying system of claim 3 wherein said single flexible hose incorporates mixing means for said combined flow of first and second components.

5. The spraying system of claim 3 wherein said spraying means is a spray gun with a handle, said handle has rotatable connecting means at its base, said single flexible hose in connected to said rotating connecting means, and said spray gun handle carries a mixing means for said plural component material components.

6. The spraying system of claim 2 wherein said valve means comprises a valve connected with said first and second connections for said first and second components of the coating material, said connection for said solvent and said output connection; said valve having a first position interconnecting said first and second connections and said output connection blocking said connection of said solvent and permitting a flow of combined first and second components to said output connection, and a second position blocking said first and second connections, connecting said solvent connection to said output connection and permitting a flow of solvent to said output connection.

7. The plural component spraying system of claim 6 wherein said means is adapted for attachment to a workman's belt, said connections are adapted to accept said hoses at a convenient location and from a convenient direction, and said valve means includes a handle extending therefrom for easy operation by a workman's hand.

8. The spraying system of claim 1 wherein the nozzle assembly comprises:
   - a nozzle body having a central opening at its longitudinal center line in which the airless liquid nozzle is positioned;
   - a pair of air nozzles equally spaced on opposing sides of the longitudinal center line of the nozzle body for directing expanding first flows of compressed air at the planar surfaces of the fan-like film; and
   - a pair of air orifices equally spaced on opposing sides of the longitudinal center line of the nozzle body and located on a line that perpendicularly bisects the line between the pair of air nozzles, for directing said second flows of compressed air at the expanding edges of the fan-like film,
   - said air nozzles being oriented to direct the first flows of compressed air to intersect the longitudinal center line of the nozzle body a fraction of an inch in front of the nozzle body, and
   - said air orifices being positioned to direct the second flows of compressed air forwardly of the nozzle body and generally parallel to its longitudinal center line.

9. A method of forming a coating on an article, comprising:
   - delivering a flow of coating material to a spraying means;
   - delivering a flow of compressed air to said spraying means;

forming the coating material into a fan-like film with expanding edges extending from the spraying means;

directing a first flow of compressed air having greater width than depth to intersect the fan-like film of said coating material within a fraction of an inch of the spraying means to assist in the formation of a particle spray;

directing a second flow of compressed air to substantially confine the particle spray downstream of intersection of the expanding air flow and fan-like film, said particle spray of coating material being substantially confined in a spray pattern of reduced size; and directing the spray particles at the article where the spray particles form a coating.

10. The method of claim 9 wherein said coating material is a paint.

11. A method of forming a coating on an article, comprising:

delivering a flow of coating material to a spraying means;

delivering a flow of compressed air to said spraying means;

forming the coating material into a fan-like film with expanding edges extending from the spraying means;

dividing the flow of compressed air into two air flows having greater width than depth and directing said two air flows at the fan-like film of said coating material from opposite sides of the film within a fraction of an inch of the spraying means;

dividing the flow of compressed air into two substantially parallel air jets directed at the expanding edges of the fan-like film downstream of intersection of the expanding air flows, said mixture being formed into a spray pattern with particles of coating material substantially contained in said spray pattern; and directing the spray particles at a substrate to form a coating.

12. The method of claim 11 wherein said coating material is a decorative or protective coating.

13. In an industrial apparatus for forming a coating on an article, having a spraying means including an airless liquid nozzle for forming coating material into a fan-like liquid film with edges extending from the liquid nozzle and a plurality of air orifices, the improvement wherein said spraying means comprises:

a nozzle assembly for directing a first flow of compressed air to impinge on the fan-like liquid film closely adjacent to the airless liquid nozzle and assist in the formation of a particle spray, and for directing a second flow of compressed air forwardly at the article substantially in the plane of the fan-like liquid film to substantially confine the particle spray downstream of the impingement of the first flow of compressed air, said first flow from said nozzle assembly comprising two flows of compressed air having greater width than depth directed from opposite sides of the fan-like film, and said second flow of compressed air comprising two parallel flows of compressed air directed at the expanding edges of the fan-like film downstream of the impingement of the first flows, said first and second flows of air interacting with the fan-like film to assist atomization and capture the particle spray.

14. The apparatus of claim 13 wherein the nozzle assembly comprises:

a nozzle body having a central opening at its longitudinal center line in which the airless liquid nozzle is positioned;

a pair of air nozzles equally spaced on opposing sides of the longitudinal center line of the nozzle body for directing expanding first flows of compressed air at the planar surfaces of the fan-like film; and a pair of air orifices equally spaced on opposing sides of the longitudinal center line of the nozzle body and located on a line that perpendicularly bisects the line between the pair of air nozzles, for directing said second flows of compressed air at the expanding edges of the fan-like film, said air nozzles being oriented to direct the first flows of compressed air to intersect the longitudinal center line of the nozzle body a fraction of an inch in front of the nozzle body, and said air orifices being positioned to direct the second flows of compressed air forwardly of the nozzle body and generally parallel to its longitudinal center line.

* * * * *

UNITED STATES PATENT AND TRADEMARK OFFICE
CERTIFICATE OF CORRECTION

PATENT NO. : 5,178,326

DATED : January 12, 1993

INVENTOR(S) : Timothy S. Kukesh, et al.

*It is certified that error appears in the above-identified patent and that said Letters Patent is hereby corrected as shown below:*

On the title page, item [57] Abstract, line 8, after "connections" insert --supported--.

--supported--.

In Col. 2, line 49, delete "No." and insert --Nos.--.

In Col. 7, line 59, after "system", insert --of the--.

In Col. 7, line 65, delete "3A" and insert --3--.

In Col. 8, line 35, delete "15" and insert --14--.

In Col. 20, line 34, delete "Fib." and insert --FIG.--.

In Col. 22, line 28, delete "33" and insert --331--.

UNITED STATES PATENT AND TRADEMARK OFFICE
CERTIFICATE OF CORRECTION

PATENT NO. : 5,178,326
DATED : January 12, 1993
INVENTOR(S) : Timothy S. Kukesh, et al It is certified that error appears in the above-indentified patent and that said Letters Patent is hereby corrected as shown below:

In Col. 22, line 40, delete "angel" and insert --angle--.

Signed and Sealed this

Nineteenth Day of July, 1994

*Attest:*

BRUCE LEHMAN

*Attesting Officer*  *Commissioner of Patents and Trademarks*